(12) United States Patent
Chen

(10) Patent No.: US 12,309,822 B2
(45) Date of Patent: May 20, 2025

(54) RLM ADJUSTMENT AND/OR BFD ADJUSTMENT METHOD AND DEVICE

(71) Applicant: VIVO MOBILE COMMUNICATION CO., LTD., Guangdong (CN)

(72) Inventor: Li Chen, Guangdong (CN)

(73) Assignee: VIVO COMMUNICATION CO., LTD., Guangdong (CN)

( * ) Notice: Subject to any disclaimer, the term of this patent is extended or adjusted under 35 U.S.C. 154(b) by 464 days.

(21) Appl. No.: 17/706,350

(22) Filed: Mar. 28, 2022

(65) Prior Publication Data

US 2022/0217734 A1 Jul. 7, 2022

Related U.S. Application Data

(63) Continuation of application No. PCT/CN2020/123089, filed on Oct. 23, 2020.

(30) Foreign Application Priority Data

Oct. 23, 2019 (CN) .......................... 201911014316.5

(51) Int. Cl.
*H04W 72/542* (2023.01)
*H04L 5/00* (2006.01)

(52) U.S. Cl.
CPC ......... *H04W 72/542* (2023.01); *H04L 5/0032* (2013.01)

(58) Field of Classification Search
CPC ............... H04W 72/542; H04W 24/08; H04W 52/0225; H04W 72/23; H04L 5/0032; H04B 7/0695; Y02D 30/70
See application file for complete search history.

(56) References Cited

U.S. PATENT DOCUMENTS

| 2015/0163687 A1 | 6/2015 | Lee et al. |
| 2017/0230780 A1 | 8/2017 | Chincholi et al. |

(Continued)

FOREIGN PATENT DOCUMENTS

| CN | 102595478 A | 7/2012 |
| CN | 104471972 A | 3/2015 |

(Continued)

OTHER PUBLICATIONS

LG Electronics Inc, "RRM measurement relaxation on a frequency based on the cell quality", 3GPP TSG-RAN WG2 Meeting #105bis, R2-1911299 (Year: 2019).*

(Continued)

*Primary Examiner* — Phirin Sam
*Assistant Examiner* — Mang Boi Thawng
(74) *Attorney, Agent, or Firm* — BROOKS KUSHMAN P.C.

(57) ABSTRACT

An RLM adjustment and/or BFD adjustment method and device are provided. The method includes: obtaining first information and/or parameters configured by a network side, the first information including one or more of the following: a measurement result of a terminal, status information of the terminal, environment information, and network coverage information, the parameters configured by the network side being used for determining whether to perform RLM measurement and/or BFD detection adjustment; and determining, according to the first information and/or the parameters configured by the network side, whether to perform the RLM measurement and/or BFD detection adjustment.

18 Claims, 3 Drawing Sheets

(56) References Cited

U.S. PATENT DOCUMENTS

| | | | |
|---|---|---|---|
| 2018/0115911 A1* | 4/2018 | Huang | H04W 24/10 |
| 2018/0167856 A1* | 6/2018 | Li | H04W 36/324 |
| 2018/0287870 A1 | 10/2018 | Yerramalli et al. | |
| 2019/0028174 A1 | 1/2019 | Chakraborty et al. | |
| 2020/0059397 A1* | 2/2020 | da Silva | H04B 7/0619 |
| 2020/0178340 A1 | 6/2020 | Zhang et al. | |
| 2020/0260303 A1 | 8/2020 | Chen et al. | |
| 2022/0116802 A1* | 4/2022 | Kim | H04W 76/27 |
| 2022/0131596 A1* | 4/2022 | Sharma | H04B 7/0888 |
| 2022/0201523 A1* | 6/2022 | Lee | H04W 24/08 |
| 2022/0210681 A1* | 6/2022 | Thangarasa | H04W 56/001 |
| 2022/0217565 A1* | 7/2022 | Thangarasa | H04W 56/0045 |

FOREIGN PATENT DOCUMENTS

| | | |
|---|---|---|
| CN | 105898777 A | 8/2016 |
| CN | 108604949 A | 9/2018 |
| CN | 109391953 A | 2/2019 |
| CN | 109803304 A | 5/2019 |
| CN | 110291807 A | 9/2019 |
| IN | 103945408 A | 7/2014 |
| WO | 2018174806 A1 | 9/2018 |

OTHER PUBLICATIONS

Sony, " RRM measurements for UE power saving", 3GPP TSG RAN WG2 Meeting# 107, R2-1909904 (Year: 2019).*

First Office Action for Chinese Application No. 201911014316.5, dated Dec. 3, 2021, 7 Pages.

Second Office Action for Chinese Application No. 201911014316.5, dated May 26, 2022, 9 Pages.

International Search Report and Written Opinion for Application No. PCT/CN2020/123089, dated Nov. 25, 2020, 6 Pages.

Huawei, et al., "UE Power Consumption Reduction in RRM Measurements," 3GPP TSG RAN WG1 #95, Agenda item 7.2.9.3, Nov. 12-16, 2018, R1-1812233, Spokane, WA USA, 4 Pages.

Extended European Search Report for Application No. 20878725. 9-1216, dated Oct. 25, 2022, 12 Pages.

Ericsson, "[Draft] LS on Measurement Requirements for LAA/WiFi Hardware Sharing Problem," 3GPP TSG-RAN WG2 #101, Release: Rel-13, Feb. 26-Mar. 2, 2018, Tdoc R2-1803508, Athens, Greece, 1 Page.

Ericsson, "Measurement Requirements for LAA/WiFi Hardware Sharing Problem," 3GPP TSG-RAN WG2 #101, Agenda Item 7.3, Feb. 26-Mar. 2, 2018, Tdoc R2-1803510, Athens, Greece, 4 Pages.

* cited by examiner

RLM ADJUSTMENT AND/OR BFD ADJUSTMENT METHOD AND DEVICE

CROSS-REFERENCE TO RELATED APPLICATIONS

This application is a continuation application of International Application No. PCT/CN2020/123089 filed on Oct. 23, 2020, which claims priority to Chinese Patent Application No. 201911014316.5 filed on Oct. 23, 2019, which are incorporated herein by reference in their entireties.

TECHNICAL FIELD

Embodiments of the present disclosure relate to the field of communication technologies, and specifically, to a Radio Link Monitor (RLM) adjustment and/or Beam Failure Detection (BFD) adjustment method and device.

BACKGROUND

During energy saving of a terminal, Downlink Control Information (DCI) of a Physical Downlink Control Channel (PDCCH) indicates or introduces an advance indication signal (for example, a Wake Up Signal (WUS), Go To Sleep (GTS) or a pre-indication) to skip monitoring of a PDCCH in one or more subsequent Discontinuous Reception (DRX) cycles. That is, the terminal does not need to wake up and continue to monitor a PDCCH during DRX on Duration.

However, to ensure the reliability of a radio link and/or beam, the terminal needs to perform RLM and/or BFD periodically according to certain requirements, for example, wake up to perform RLM and/or BFD in each DRX cycle or several DRX cycles. In this case, even if there is DCI or an advance indication signal indicating that the terminal does not need to monitor a PDCCH, the terminal still needs to wake up to perform RLM and/or BFD, which is not conducive to power saving of the terminal.

SUMMARY

An objective of embodiments of the present disclosure is to provide an RLM adjustment and/or BFD adjustment method and device.

According to a first aspect, the embodiments of the present disclosure provide an RLM adjustment and/or BFD adjustment method, applied to a terminal, and including:
obtaining first information and/or parameters configured by a network side, the first information including one or more of the following: a measurement result of the terminal, status information of the terminal, environment information, and network coverage information; and
determining, according to the first information and/or the parameters configured by the network side, whether to perform RLM measurement adjustment and/or BFD detection adjustment.

According to a second aspect, the embodiments of the present disclosure further provide a terminal, including:
an obtaining module, configured to obtain first information and/or parameters configured by a network side, the first information including one or more of the following: a measurement result of the terminal, status information of the terminal, environment information, and network coverage information, the parameters configured by the network side being used for determining whether to perform RLM measurement adjustment and/or BFD detection adjustment; and
a processing module, configured to determine, according to the first information and/or the parameters configured by the network side, whether to perform the RLM measurement adjustment and/or BFD detection adjustment.

According to a third aspect, the embodiments of the present disclosure further provide a terminal, including a processor, a memory, and a program stored in the memory and capable of being run on the processor, the program implementing the steps of the RLM adjustment and/or BFD adjustment method in the first aspect when being executed by the processor.

According to a fourth aspect, the embodiments of the present disclosure further provide a computer-readable storage medium, storing a computer program, the computer program implementing the steps of the RLM adjustment and/or BFD adjustment method in the first aspect when being executed by a processor.

BRIEF DESCRIPTION OF THE DRAWINGS

Various other advantages and benefits will become clear to a person of ordinary skill in the art by reading the following detailed description of optional implementations. The accompanying drawings are merely used for illustrating the optional implementations and are not intended to constitute a limitation on the present disclosure. Throughout the accompanying drawings, the same reference numerals are used to represent the same components. In the accompanying drawings.

DETAILED DESCRIPTION

Figure 1:
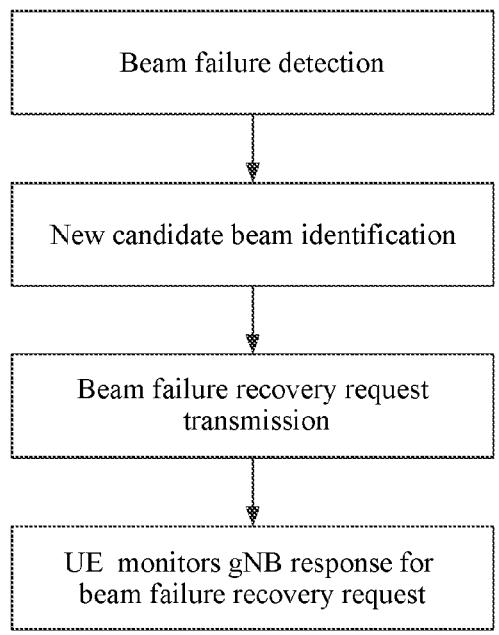
FIG. 1 is a schematic flowchart of a beam failure recovery method of a terminal in the related art.

For better understanding of the embodiments of the present disclosure, several technical points are described below:

1. About an RLM and Radio Link Failure (RLF) Functions

A Radio Link Monitor (RLM) function is provided in both a Long Term Evolution (LTE) system and a New Radio (NR) system.

In the RLM function in LTE, a terminal (for example, User Equipment (UE)) measures a PDCCH part Cell Reference Signal (CRS) and a Signal to Interference plus Noise Ratio (SINR) to implement monitoring of a radio link.

When the measured PDCCH part CRS is less than a particular threshold, it is determined that the radio link is Out-Of-Sync (OOS). A physical layer notifies a higher layer (for example, a Radio Resource Control (RRC) layer) of an out-of-sync indication. If the RRC layer has N consecutive out-of-sync indications, the UE starts a Timer T1.

When the measured PDCCH part CRS is greater than a particular threshold, it is determined that the radio link is In-Sync (IS). The physical layer notifies the higher layer (for example, the RRC layer) of an in-sync indication. If the RRC layer has M consecutive in-sync indications, the UE stops the running of the Timer T1.

If the running of the Timer T1 expires, the UE determines that the radio link fails.

Quantities (N and M) of times of counts of "out-of-sync" and "in-sync" are configured by a network, and when the quantities of times are reached, the running duration of the Timer T1 is also configurable by a network side.

2. About BFD.

In the future $5^{th}$ generation (5G) mobile communications system, high-frequency communication and a large-scale antenna technology are introduced to achieve the objective of a 20-Gbps downlink transmission rate and a 10-Gbps uplink transmission rate. The high-frequency communication can provide wider system bandwidth and smaller antenna size, which is more conducive for large-scale antenna deployment in base stations (for example, Next Generation NodeB (gNB)) and UEs. The high-frequency communication has the disadvantages of larger path loss, high susceptibility to interference, and a more vulnerable link, while the large-scale antenna technology can provide a larger antenna gain. Therefore, the combination of high-frequency communication and a large-scale antenna is an inevitable trend of future 5G mobile communications systems. However, the use of the large-scale antenna technology cannot solve all the problems of the high-frequency communication, for example, the vulnerability of a link. When blocking is encountered in the high-frequency communication, a beam failure recovery mechanism can quickly switch between beams, to switch a communication link from a poor beam to a better beam to avoid a wireless link failure, thereby effectively improving the robustness of the link.

In the $3^{rd}$ Generation Partnership Project (3GPP) Radio Access Network (RAN)1 #88Bis, the following conclusions are reached about a UE beam failure recovery mechanism:

UE beam failure recovery mechanism includes the following aspects:

Beam failure detection;

New candidate beam identification;

Beam failure recovery request transmission; and

UE monitors gNB response for beam failure recovery request.

FIG. 1 shows a possible beam failure recovery method of UE. New candidate beam identification may be performed before beam failure detection or after beam failure detection.

3. Determination of a Beam Failure:

During current beam failure detection, a physical layer determines that a particular condition (for example, all beam received signals are less than a threshold) is satisfied and then indicates a beam failure instance to a Media Access Control (MAC) layer. The MAC layer counts a quantity of beam failure instances periodically indicated by the physical layer to determine whether a beam fails. A specific counting manner may be as follows:

1. When there are N consecutive or non-consecutive instances, it is determined that a beam fails.

2. If one instance is received within one timer, a counter is increased by 1. The timer is started or restarted once an instance is received. If no instance is received before the timer expires, the counter is reset. When the counter reaches a preset quantity of times, it is determined that a beam fails.

The current technical discussion does not address RLM measurement relaxation and/or BFD detection relaxation. When a PDCCH or an advance indication signal indicates that the PDCCH is not to be monitored, a terminal still needs to wake up from a DRX off state to perform RLM and/or BFD, and as a result the objective of power saving fails to be achieved.

With the development of smart terminals, nowadays there are more and more sensors on smart terminals and the sensors are becoming more and more intelligent. In many cases and scenarios, a terminal can precisely know whether the terminal is in a mobile state as well as a movement speed and related movement information. In addition, when carrying more sensors, a smart terminal can obtain status or environment information or coverage information of UE. Based on such information, more control optimization can be performed on the behavior of the UE. For example, RLM measurement relaxation and/or BFD detection relaxation is performed in a scenario in which the terminal is in an adequate channel condition or is at the center of a cell or the terminal is not moving fast. The objective of power saving can be effectively achieved.

In addition, the terms "include" and any variant thereof in the description and claims of the present application are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device. In addition, "and/or" used in the description and claims represents at least one of connected objects. For example, A and/or B represents the following three cases: Only A exists, only B exists, and both A and B exist.

In addition, in the embodiments of the present disclosure, the word "exemplary" or "for example" is used to represent giving an example, an illustration, or a description. Any embodiment or design scheme described as an "exemplary" or "for example" in the embodiments of the present disclosure should not be explained as being more optional or having more advantages than another embodiment or design scheme. Exactly, use of the word "example" or "for example" or the like is intended to present a related concept in a specific manner.

The technologies described herein are not limited to a 5G system and subsequent evolved communications systems, and are not limited to an LTE/LTE-Advanced (LTE-A) system, or may be applied to various wireless communications systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems.

The terms "system" and "network" are often used interchangeably. A CDMA system can implement radio technologies such as CDMA2000 and Universal Terrestrial Radio Access (UTRA). The UTRA includes Wideband CDMA (WCDMA) and other CDMA variants. A TDMA system can implement radio technologies such as Global System for Mobile Communications (GSM). An OFDMA system can implement radio technologies such as Ultra Mobile Broadband (UMB), Evolved UTRA (E-UTRA), IEEE 802.11 (Wi-Fi), IEEE 802.16 (WiMAX), IEEE 802.20, and Flash-OFDM. UTRA and E-UTRA are parts of a Universal Mobile Telecommunications System (UMTS). LTE and more advanced LTE (such as LTE-A) are newer versions of UMTS that use E-UTRA. UTRA, E-UTRA, UMTS, LTE, LTE-A, and GSM are described in the literature from the organization called the $3^{rd}$ Generation Partnership Project (3GPP). CDMA2000 and UMB are described in the literature from the organization called the 3$^{rd}$ Generation Partnership Project 2 (3GPP2). The technologies described herein can be used for both the systems and radio technologies mentioned above, as well as for other systems and radio technologies.

RLM measurement relaxation or BFD detection relaxation herein may include at least one of the following:

(1) RLM measurement relaxation or BFD detection relaxation in time domain, that is, extension of a measurement period or reduction of a quantity of measurement samples of an RLM measurement or BFD detection layer 1 (L1).

(2) RLM measurement relaxation or BFD detection relaxation in time domain, that is, extension of an indication interval of an RLM measurement or BFD detection layer 2 or layer 3 (L2/L3).

(3) RLM measurement or BFD detection is not performed or RLM measurement or BFD detection is reduced within a period of time.

(4) RLM measurement or BFD detection upper layer indication is not performed or RLM measurement or BFD detection upper layer indication is reduced within a period of time.

(5) A quantity of reference signals of RLM measurement or BFD detection is reduced.

RLM measurement enhancement or BFD detection enhancement herein may include at least one of the following:

(1) RLM measurement enhancement or BFD detection enhancement in time domain, that is, reduction of a measurement period or increase of a quantity of measurement samples of an RLM measurement or BFD detection layer 1 (L1).

(2) RLM measurement enhancement or BFD detection enhancement in time domain, that is, reduction of an indication interval of an RLM measurement or BFD detection (L2/L3).

(3) RLM measurement or BFD detection is increased within a period of time.

(4) RLM measurement or BFD detection upper layer indication is increased within a period of time.

(5) A quantity of reference signals of RLM measurement or BFD detection is increased.

Figure 2:
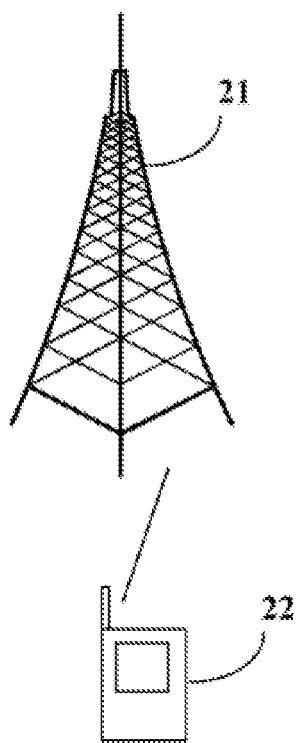
FIG. 2 is a schematic architectural diagram of a wireless communications system.

The following describes the embodiments of the present disclosure with reference to the accompanying drawings. An RLM and/or BFD adjustment method and device provided in the embodiments of the present disclosure are applicable to a wireless communications system. FIG. 2 is a schematic architectural diagram of a wireless communications system according to an embodiment of the present disclosure. As shown in FIG. 2, the wireless communications system may include a network device 20 and a terminal 21. The terminal 21 may be denoted as UE 21. The terminal 21 may perform communication (signaling transmission or data transmission) with the network device 20. In an actual application, connections between the foregoing devices may be wireless connections. For convenience of visually showing a connection relationship between the devices, solid lines are used for illustration in FIG. 2.

The network device 20 provided in the embodiments of the present disclosure may be a base station. The base station may be a conventional base station, or may be an evolved base station (eNB), or may be a device such as a network device (for example, a next generation base station (gNB) or a transmission and reception point (TRP)) in a 5G system.

The terminal 21 provided in the embodiments of the present disclosure may be a mobile phone, a tablet computer, a notebook computer, an ultra-mobile personal computer (UMPC), a netbook or a personal digital assistant (PDA), a mobile Internet device (MID), a wearable device, an in-vehicle device, or the like.

Figure 3:
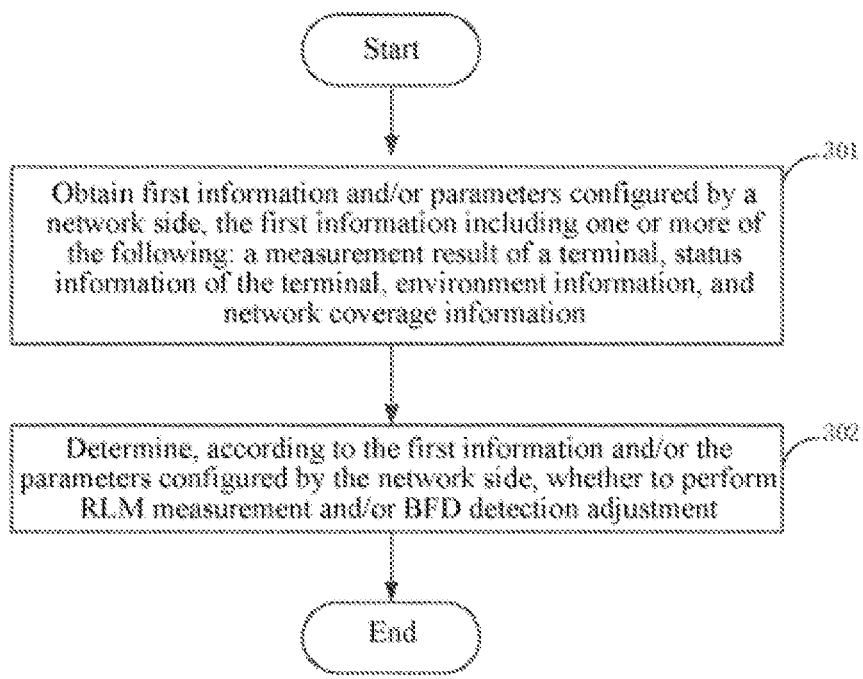
FIG. 3 is a flowchart of an RLM and/or BFD adjustment method according to an embodiment of the present disclosure.

Referring to FIG. 3, the embodiments of the present disclosure provide an RLM and/or BFD adjustment method. The method may be performed by a terminal, and includes step 301 and step 302.

Step 301: Obtain first information and/or parameters configured by a network side, the first information including one or more of the following: a measurement result of the terminal, status information of the terminal, environment information, and network coverage information.

Optionally, the parameters configured by the network side are configured in at least one manner in the following: (1) the network side configures the corresponding parameters for each terminal; (2) the network side configures the corresponding parameters for each cell; (3) the network side configures the corresponding parameters for each frequency, carrier, band or bandwidth part; (4) the network side configures the corresponding parameters for each frequency, carrier, band or bandwidth part of each terminal; and (5) the network side configures the corresponding parameters for each beam.

Optionally, a sensor in the related art of the terminal is used to obtain the status information, the environment information, and/or the network coverage information. The status information may represent a movement status of the terminal. The environment information may represent a status of an environment in which the terminal is located. The network coverage information may represent a status of network coverage at the position of the terminal.

Step 302: Determine, according to the first information and/or the parameters configured by the network side, whether to perform RLM measurement and/or BFD detection adjustment.

In some implementations, the terminal receives the parameters configured by the network side, and determines, according to the measurement result and/or the parameters configured by the network side, whether to perform the RLM measurement and/or BFD detection adjustment.

For example, the parameters configured by the network side are received by using a Radio Resource Control (RRC) message or a broadcast message.

The measurement result may be a result obtained by measuring a cell and/or a beam, and includes one or more of the following: a Reference Signal Receiving Power (RSRP); a Reference Signal Receiving Quality (RSRQ); a signal-to-noise and interference ratio (SINR); and a Channel Quality Indicator (CQI).

The measuring a beam may include: measuring a Synchronization Signal block (SSB), a CSI Reference Signal (CSI-RS), a Demodulation Reference Signal (DMRS) or another reference signal.

The measuring a cell includes measuring a current cell and/or a neighboring cell.

The parameters configured by the network side may be configured in a manner in the following:

(1) The network side configures the corresponding parameters for each terminal (Per-UE), that is, a network configures a separate adjustment determination parameter for each UE.

(2) The network side configures the corresponding parameters for each cell (Per-cell), that is, adjustment determination parameters configured by the network in the range of one cell are consistent. The terminal applies the parameter in the range of a cell.

(3) The network side configures the corresponding parameters for each frequency, carrier, band or bandwidth part (Per-frequency/carrier/band/BWP), that is, adjustment determination parameters configured by the network in the range of one frequency/carrier/band/BWP are consistent.

(4) The network side configures the corresponding parameters for each frequency, carrier, band or bandwidth part of each terminal (Per-UE per-frequency/carrier/band/BWP), that is, adjustment determination parameters configured by the network for each UE in the range of one frequency/carrier/band/BWP are consistent.

(5) The network side configures the corresponding parameters for each beam (Per-Beam), that is, applies the parameters to measurement corresponding to the beam.

Further, before receiving the parameters configured by the network side, the terminal may send a request message to the network side.

The request message is used for requesting the network side to configure the parameters configured by the network side, or the request message indicates that the terminal needs to perform RLM measurement relaxation, RLM measurement enhancement, normal RLM measurement, BFD detection relaxation, BFD detection enhancement or normal BFD detection.

In some implementations, the determining, according to the first information and the parameters configured by the network side, whether to perform RLM measurement adjustment and/or BFD detection adjustment includes:

(1) determining, according to a measurement result of a beam and a preset threshold, whether to perform the RLM measurement adjustment and/or BFD detection adjustment;

for example, if the measurement result of the beam and the preset threshold satisfy a first condition, performing RLM measurement relaxation and/or BFD detection relaxation;

for example, if the measurement result of the beam and the preset threshold satisfy a second condition, performing normal RLM measurement and/or normal BFD detection; and for example, if the measurement result of the beam and the preset threshold satisfy a third condition, performing RLM measurement enhancement and/or BFD detection enhancement.

(2) determining, according to measurement results of a current cell and a preset threshold, whether to perform the RLM measurement adjustment and/or BFD detection adjustment;

(3) determining, according to a measurement result of a neighboring cell and a preset threshold, whether to perform the RLM measurement adjustment and/or BFD detection adjustment;

(4) determining, according to a measurement result of a current cell, a measurement result of a neighboring cell, and a preset threshold, whether to perform the RLM measurement adjustment and/or BFD detection adjustment;

for example, if the measurement result of the current cell and the preset threshold satisfy a fourth condition, and/or if the measurement result of the neighboring cell and the preset threshold satisfy a fifth condition, performing RLM measurement relaxation and/or BFD detection relaxation;

for example, if the measurement result of the current cell and the preset threshold satisfy a sixth condition, and/or if the measurement result of the neighboring cell and the preset threshold satisfy a seventh condition, performing normal RLM measurement and/or normal BFD detection; and for example, if the measurement result of the current cell and the preset threshold satisfy an eighth condition, and/or if the measurement result of the neighboring cell and the preset threshold satisfy a ninth condition, performing RLM measurement enhancement and/or BFD detection enhancement.

In the embodiments of the present disclosure, one or more preset thresholds corresponding to the measurement result of the beam are the same as or different from a threshold for determining in a connected state or an idle state whether to perform measurement on a neighboring cell or at another frequency.

In the embodiments of the present disclosure, one or more preset thresholds corresponding to the measurement result of the current cell are the same as or different from a threshold for determining in a connected state or an idle state whether to perform measurement on a neighboring cell or at another frequency.

In the embodiments of the present disclosure, one or more preset thresholds corresponding to the measurement result of the neighboring cell are the same as or different from a threshold for determining in a connected state or an idle state whether to perform measurement on a neighboring cell or at another frequency.

In some implementations, the first condition includes one of the following:

(1) the measurement result of the beam is greater than or equal to a first threshold;

(2) the measurement result of the beam is greater than or equal to the first threshold within a first preset time;

(3) the measurement result of the beam remains greater than or equal to the first threshold within the first preset time;

(4) the measurement result of the beam is greater than or equal to the first threshold, and the measurement result of the beam is not less than a second threshold within a second preset time;

(5) the measurement result of the beam is greater than or equal to the first threshold, and the measurement result of the beam remains not less than the second threshold within the second preset time;

(6) a change in the measurement result of the beam within a third preset time is less than or equal to a third threshold;

(7) the change in the measurement result of the beam within the third preset time is less than or equal to the third threshold, and a change in the measurement result of the current cell within a fourth preset time is greater than or equal to a fourth threshold; and (8) the change in the measurement result of the beam within the third preset time is less than or equal to the third threshold, and no change in the measurement result of the beam within a fifth preset time is greater than or equal to a fifth threshold.

In some implementations, the second condition includes one of the following:

(1) the measurement result of the beam is less than or equal to or greater than a sixth threshold;

(2) the measurement result of the beam is less than or equal to or greater than the sixth threshold within a sixth preset time;

(3) the measurement result of the beam remains less than or equal to or greater than the sixth threshold within the sixth preset time;

(4) the measurement result of the beam is less than or equal to or greater than the sixth threshold, and the measurement result of the beam is not greater than or not less than a seventh threshold within a seventh preset time;

(5) the measurement result of the beam is less than or equal to or greater than the sixth threshold, and the measurement result of the beam remains not greater than or not less than an eighth threshold within an eighth preset time;

(6) a change in the measurement result of the beam within a ninth preset time is less than or equal to or greater than a ninth threshold;

(7) a change in the measurement result of the beam within a tenth preset time is greater than or equal to a tenth threshold, and no change in the measurement result of the beam within an eleventh preset time is less than or equal to an eleventh threshold; and (8) a change in the measurement result of the beam within a twelfth preset time is less than or equal to a twelfth threshold, and a change in the measurement result of the beam within a thirteenth preset time is greater than or equal to a thirteenth threshold.

In some implementations, the third condition includes one of the following:

(1) the measurement result of the beam is less than or equal to a fourteenth threshold;

(2) the measurement result of the beam is less than or equal to the fourteenth threshold within a fourteenth preset time;

(3) the measurement result of the beam remains less than or equal to the fourteenth threshold within the fourteenth preset time;

(4) the measurement result of the beam is less than or equal to the fourteenth threshold, and the measurement result of the beam or the current cell is not less than or not greater than a fifteenth threshold within a fifteenth preset time;

(5) the measurement result of the beam is less than or equal to the fourteenth threshold, and the measurement result of the beam or the current cell remains not less than or not greater than the fifteenth threshold within the fifteenth preset time;

(6) a change in the measurement result of the beam within a sixteenth preset time is greater than or equal to a sixteenth threshold;

(7) the change in the measurement result of the beam within the sixteenth preset time is greater than or equal to the sixteenth threshold, and a change in the measurement result of the beam within a seventeenth preset time is less than or equal to a seventeenth threshold; and (8) the change in the measurement result of the beam within the sixteenth preset time is greater than or equal to the sixteenth threshold, and no change in the measurement result of the beam within an eighteenth preset time is less than or equal to an eighteenth threshold.

In some implementations, the fourth condition includes one of the following:

(1) the measurement result of the current cell is greater than or equal to a nineteenth threshold;

(2) the measurement result of the current cell is greater than or equal to the nineteenth threshold within a nineteenth preset time;

(3) the measurement result of the current cell remains greater than or equal to the nineteenth threshold within the nineteenth preset time;

(4) the measurement result of the current cell is greater than or equal to the nineteenth threshold, and the measurement result of the current cell is not less than a twentieth threshold within a twentieth preset time;

(5) the measurement result of the current cell is greater than or equal to the nineteenth threshold, and the measurement result of the current cell remains not less than the twentieth threshold within the twentieth preset time;

(6) a change in the measurement result of the current cell within a twenty-first preset time is less than or equal to a twenty-first threshold;

(7) the change in the measurement result of the current cell within the twenty-first preset time is less than or equal to the twenty-first threshold, and a change in the measurement result of the current cell within a twenty-second preset time is not greater than or equal to a twenty-second threshold; and (8) the change in the measurement result of the current cell within the twenty-first preset time is less than or equal to the twenty-first threshold, and a change in the measurement result of the current cell within a twenty-third preset time is greater than or equal to a twenty-third threshold.

In some implementations, the sixth condition includes one of the following:

(1) the measurement result of the current cell is less than or equal to or greater than a twenty-fourth threshold;

(2) the measurement result of the current cell is less than or equal to or greater than the twenty-fourth threshold within a twenty-fourth preset time;

(3) the measurement result of the current cell remains less than or equal to or greater than the twenty-fourth threshold within the twenty-fourth preset time;

(4) the measurement result of the current cell is less than or equal to or greater than the twenty-fourth threshold, and the measurement result of the current cell is not greater than or not less than a twenty-fifth threshold within a twenty-fifth preset time;

(5) the measurement result of the current cell is less than or equal to or greater than the twenty-fourth threshold, and the measurement result of the current cell remains not greater than or not less than the twenty-fifth threshold within the twenty-fifth preset time;

(6) a change in the measurement result of the current cell within a twenty-sixth preset time is greater than or equal to or less than a twenty-sixth threshold;

(7) the change in the measurement result of the current cell within the twenty-sixth preset time is greater than or equal to the twenty-sixth threshold, and no change in the measurement result of the current cell within a twenty-seventh preset time is less than or equal to a twenty-seventh threshold; and (8) the change in the measurement result of the current cell within the twenty-sixth preset time is greater than or equal to the twenty-sixth threshold, and a change in the measurement result of the current cell within a twenty-eighth preset time is greater than or equal to a twenty-eighth threshold.

In some implementations, the eighth condition includes one of the following:

(1) the measurement result of the current cell is less than or equal to a twenty-ninth threshold;

(2) the measurement result of the current cell is less than or equal to the twenty-ninth threshold within a twenty-ninth preset time;

(3) the measurement result of the current cell remains less than or equal to the twenty-ninth threshold within the twenty-ninth preset time;

(4) the measurement result of the current cell is less than or equal to the twenty-ninth threshold, and the measurement result of the current cell is not less than or not greater than a thirtieth threshold within a thirtieth preset time;
(5) the measurement result of the current cell is less than or equal to the twenty-ninth threshold, and the measurement result of the current cell remains not less than or not greater than the thirtieth threshold within the thirtieth preset time;
(6) a change in the measurement result of the current cell within a thirty-first preset time is greater than or equal to a thirty-first threshold;
(7) the change in the measurement result of the current cell within the thirty-first preset time is greater than or equal to the thirty-first threshold, and a change in the measurement result of the current cell within a thirty-second preset time is less than or equal to a thirty-second threshold; and
(8) the change in the measurement result of the current cell within the thirty-first preset time is greater than or equal to the thirty-first threshold, and no change in the measurement result of the current cell within the thirty-second preset time is less than or equal to the thirty-second threshold.

In some implementations, the fifth condition includes one of the following:
(1) the measurement result of the neighboring cell is less than or equal to a thirty-third threshold;
(2) the measurement result of the neighboring cell is less than or equal to the thirty-third threshold within a thirty-third preset time;
(3) the measurement result of the neighboring cell remains less than or equal to the thirty-third threshold within the thirty-third preset time;
(4) the measurement result of the neighboring cell is less than or equal to the thirty-third threshold, and the measurement result of the neighboring cell is not greater than a thirty-fourth threshold within a thirty-fourth preset time;
(5) the measurement result of the neighboring cell is less than or equal to the thirty-third threshold, and the measurement result of the neighboring cell remains not greater than the thirty-fourth threshold within the thirty-fourth preset time;
(6) a change in the measurement result of the neighboring cell within a thirty-fifth preset time is greater than or equal to a thirty-fifth threshold;
(7) the change in the measurement result of the neighboring cell within the thirty-fifth preset time is greater than or equal to the thirty-fifth threshold, and no change in the measurement result of the neighboring cell within a thirty-sixth preset time is less than or equal to a thirty-sixth threshold; and
(8) the change in the measurement result of the neighboring cell within the thirty-fifth preset time is greater than or equal to the thirty-fifth threshold, and a change in the measurement result of the neighboring cell within a thirty-seventh preset time is less than or equal to a thirty-seventh threshold.

In some implementations, the seventh condition includes one of the following:
(1) the measurement result of the neighboring cell is greater than or equal to or less than a thirty-eighth threshold;
(2) the measurement result of the neighboring cell is greater than or equal to or less than the thirty-eighth threshold within a thirty-eighth preset time;
(3) the measurement result of the neighboring cell remains greater than or equal to or less than the thirty-eighth threshold within the thirty-eighth preset time;
(4) the measurement result of the neighboring cell is greater than or equal to or less than the thirty-eighth threshold, and the measurement result of the neighboring cell is not less than or not greater than a thirty-ninth threshold within a thirty-ninth preset time;
(5) the measurement result of the neighboring cell is greater than or equal to or less than the thirty-eighth threshold, and the measurement result of the neighboring cell remains not less than or not greater than the thirty-ninth threshold within the thirty-ninth preset time;
(6) a change in the measurement result of the neighboring cell within a fortieth preset time is less than or equal to or greater than a fortieth threshold;
(7) the change in the measurement result of the neighboring cell within the fortieth preset time is less than or equal to the fortieth threshold, and no change in the measurement result of the neighboring cell within a forty-first preset time is greater than or equal to a forty-first threshold; and
(8) the change in the measurement result of the neighboring cell within the fortieth preset time is less than or equal to the fortieth threshold, and a change in the measurement result of the neighboring cell within a forty-second preset time is less than or equal to a forty-second threshold.

In some implementations, the ninth condition includes one of the following:
(1) the measurement result of the neighboring cell is greater than or equal to a forty-third threshold;
(2) the measurement result of the neighboring cell is greater than or equal to the forty-third threshold within a forty-third preset time;
(3) the measurement result of the neighboring cell remains greater than or equal to the forty-third threshold within the forty-third preset time;
(4) the measurement result of the neighboring cell is greater than or equal to the forty-third threshold, and the measurement result of the neighboring cell is not greater than or not less than a forty-fourth threshold within a forty-fourth preset time;
(5) the measurement result of the neighboring cell is greater than or equal to the forty-third threshold, and the measurement result of the neighboring cell remains not greater than or not less than the forty-fourth threshold within the forty-fourth preset time;
(6) a change in the measurement result of the neighboring cell within a forty-fifth preset time is less than or equal to a forty-fifth threshold;
(7) the change in the measurement result of the neighboring cell within the forty-fifth preset time is less than or equal to the forty-fifth threshold, and a change in the measurement result of the neighboring cell within a forty-sixth preset time is greater than or equal to a forty-sixth threshold; and
(8) the change in the measurement result of the neighboring cell within the forty-fifth preset time is less than or equal to the forty-fifth threshold, and no change in the measurement result of the neighboring cell within a forty-seventh preset time is greater than or equal to a forty-seventh threshold.

In some implementations, the parameters configured by the network side include one or more of the following: a parameter of a timer, a third preset time, a preset measurement period quantity, a preset detection period quantity, a preset measurement sample quantity, a preset detection sample quantity, and a parameter of a counter; and the determining, according to the parameters configured by the network side, whether to perform RLM measurement and/or BFD detection adjustment includes one or more of the following:

(1) if a time at which the terminal performs RLM measurement relaxation, RLM measurement enhancement, BFD detection relaxation or BFD detection enhancement reaches the third preset time, performing normal RLM measurement or normal BFD detection;

(2) when the terminal starts to perform the RLM measurement relaxation, the RLM measurement enhancement, the BFD detection relaxation or the BFD detection enhancement, starting the timer, and when the timer expires, performing the normal RLM measurement or the normal BFD detection;

(3) if a measurement period quantity of performing the RLM measurement relaxation or the RLM measurement enhancement by the terminal reaches the preset measurement period quantity, performing the normal RLM measurement;

(4) if a detection period quantity of performing the BFD detection relaxation or the BFD detection enhancement by the terminal reaches the preset detection period quantity, performing the normal BFD detection;

(5) if a measurement sample quantity of performing the RLM measurement relaxation or the RLM measurement enhancement by the terminal reaches the preset measurement sample quantity, performing the normal RLM measurement;

(6) if a detection sample quantity of performing the BFD detection relaxation or the BFD detection enhancement by the terminal reaches the preset detection sample quantity, performing the normal BFD detection;

(7) when the terminal starts to perform the RLM measurement relaxation or the RLM measurement enhancement, starting the counter, adjusting a count value of the counter according to a measurement period of the RLM measurement relaxation or the RLM measurement enhancement, and when the count value reaches a preset quantity, performing the normal RLM measurement;

(8) when the terminal starts to perform the BFD detection relaxation or the BFD detection enhancement, starting the counter, adjusting a count value of the counter according to a detection period of the BFD detection relaxation or the BFD detection enhancement, and when the count value reaches a preset quantity, performing the normal BFD detection;

(9) when the terminal starts to perform the RLM measurement relaxation or the RLM measurement enhancement, starting the counter, adjusting a count value of the counter according to a measurement sample of the RLM measurement relaxation or the RLM measurement enhancement, and when the count value reaches a preset quantity, performing the normal RLM measurement; and

(10) when the terminal starts to perform the BFD detection relaxation or the BFD detection enhancement, starting the counter, adjusting a count value of the counter according to a detection sample of the BFD detection relaxation or the BFD detection enhancement, and when the count value reaches a preset quantity, performing the normal BFD detection.

In some implementations, the determining, according to the first information, whether to perform RLM measurement and/or BFD detection adjustment includes:

if it is determined according to the first information that the terminal has entered a coverage area of a corresponding cell or beam, performing RLM measurement relaxation, RLM measurement enhancement, BFD detection relaxation or BFD detection enhancement; or if it is determined according to the first information that the terminal has left a coverage area of a corresponding cell or beam, performing normal RLM measurement or normal BFD detection.

It should be noted that the thresholds may be the same or different.

Further, the foregoing thresholds may be the same as or different from the S-measure threshold in the related art. The S-measure threshold is used for determining in a connected state or an idle state whether to perform measurement on a neighboring cell or at another frequency.

In the embodiments of the present disclosure, it may be determined, according to information related to a terminal (for example, a measurement result of the terminal, status information of the terminal, environment information, and network coverage information) and/or parameters configured by a network side, whether it is necessary to perform RLM measurement adjustment and/or BFD detection adjustment, to avoid the problem that the terminal still needs to wake up to perform RLM and/or BFD even if there is DCI or an advance indication signal indicating that the terminal does not need to monitor a PDCCH, thereby saving the power of the terminal.

The implementations of the embodiments of the present disclosure are described below with reference to Example 1, Example 2, Example 3, Example 4, and Example 5.

Example 1

The parameters configured by the network side include one or more of the following: a first threshold and a second threshold (that is, it is equivalent to that the parameters configured by the network side include an adjustment determination threshold). It is determined according to the following rule whether to perform the RLM measurement or BFD detection adjustment.

(1-0) If the measurement result of the beam is greater than or equal to the first threshold, the terminal performs the RLM measurement relaxation or the BFD detection relaxation; or, when the measurement result of the beam is less than or equal to the second threshold, the terminal performs normal RLM measurement or normal BFD detection. That is, RLM or BFD is performed according to a configuration in the related art.

(1-1) If the measurement result of the current cell is greater than or equal to the first threshold, the terminal performs the RLM measurement relaxation or the BFD detection relaxation; or, when the measurement result of the current cell is less than or equal to the second threshold, the terminal performs the normal RLM measurement or the normal BFD detection. That is, RLM or BFD is performed according to a configuration in the related art.

(1-2) If the measurement result of the neighboring cell is less than or equal to the first threshold, the terminal performs the RLM measurement relaxation or the BFD detection relaxation; or, when the measurement result of the neighboring cell is greater than or equal to the second threshold, the terminal performs the normal RLM measurement or the normal BFD detection. That is, RLM or BFD is performed according to a configuration in the related art.

(1-3) If the measurement result of the current cell is greater than or equal to the first threshold and the measurement result of the neighboring cell is less than or equal to the first threshold, the terminal performs the RLM measurement relaxation or the BFD detection relaxation; or, when the measurement result of the current cell is less than or equal to the second threshold and the measurement result of the neighboring cell is greater than or equal to the second threshold, the terminal performs the normal RLM measurement or the normal BFD detection. That is, RLM or BFD is performed according to a configuration in the related art.

(2-0) If the measurement result of the beam is greater than or equal to the first threshold, the terminal performs the normal RLM measurement or the normal BFD detection; or, when the measurement result of the beam is less than or equal to the second threshold, the terminal performs the RLM measurement enhancement or the BFD detection enhancement.

(2-1) If the measurement result of the current cell is greater than or equal to the first threshold, the terminal performs the normal RLM measurement or the normal BFD detection; or, when the measurement result of the current cell is less than or equal to the second threshold, the terminal performs the RLM measurement enhancement or the BFD detection enhancement.

(2-2) If the measurement result of the neighboring cell is less than or equal to the first threshold, the terminal performs the normal RLM measurement or the normal BFD detection; or, when the measurement result of the neighboring cell is greater than or equal to the second threshold, the terminal performs the RLM measurement enhancement or the BFD detection enhancement.

(2-3) If the measurement result of the current cell is greater than or equal to the first threshold and the measurement result of the neighboring cell is less than or equal to the first threshold, the terminal performs the normal RLM measurement or the normal BFD detection; or, when the measurement result of the current cell is less than or equal to the second threshold and the measurement result of the neighboring cell is greater than or equal to the second threshold, the terminal performs the RLM measurement enhancement or the BFD detection enhancement.

(3-0) If the measurement result of the beam is greater than or equal to the first threshold, the terminal performs the RLM measurement relaxation or the BFD detection relaxation; or, when the measurement result of the beam is less than or equal to the second threshold, the terminal performs the RLM measurement enhancement or the BFD detection enhancement.

(3-1) If the measurement result of the current cell is greater than or equal to the first threshold, the terminal performs the RLM measurement relaxation or the BFD detection relaxation; or, when the measurement result of the current cell is less than or equal to the second threshold, the terminal performs the RLM measurement enhancement or the BFD detection enhancement.

(3-2) If the measurement result of the neighboring cell is less than or equal to the first threshold, the terminal performs the RLM measurement relaxation or the BFD detection relaxation; or, when the measurement result of the neighboring cell is greater than or equal to the second threshold, the terminal performs the RLM measurement enhancement or the BFD detection enhancement.

(3-3) If the measurement result of the current cell is greater than or equal to the first threshold and the measurement result of the neighboring cell is less than or equal to the first threshold, the terminal performs the RLM measurement relaxation or the BFD detection relaxation; or, when the measurement result of the current cell is less than or equal to the second threshold and the measurement result of the neighboring cell is greater than or equal to the second threshold, the terminal performs the RLM measurement enhancement or the BFD detection enhancement.

The foregoing first threshold and second threshold in (1-0) to (3-3) may be the same or different.

Further, the foregoing first threshold and/or second threshold in (1-0) to (3-3) may be the same as or different from the S-measure threshold in the related art. The S-measure threshold is used for determining in a connected state or an idle state whether to perform measurement on a neighboring cell or at another frequency.

Example 2

The parameters configured by the network side include one or more of the following: a first preset time, a third threshold, a second preset time, and a fourth threshold (that is, it is equivalent to that the parameters configured by the network side include an adjustment determination threshold and a preset time). It is determined according to the following rule whether to perform the RLM measurement or BFD detection adjustment.

Manner 1:

(1-0) If the measurement result of the beam is greater than or equal to (for example, remains greater than or equal to) the third threshold within the first preset time, the terminal performs the RLM measurement relaxation or the BFD detection relaxation; or, if the measurement result of the beam is less than or equal to (for example, remains less than or equal to) the fourth threshold within the second preset time, the terminal performs normal RLM measurement or normal BFD detection. That is, RLM or BFD is performed according to a configuration in the related art.

(1-1) If the measurement result of the current cell is greater than or equal to (for example, remains greater than or equal to) the third threshold within the first preset time, the terminal performs the RLM measurement relaxation or the BFD detection relaxation; or, if the measurement result of the current cell is less than or equal to (for example, remains less than or equal to) the fourth threshold within the second preset time, the terminal performs the normal RLM measurement or the normal BFD detection. That is, RLM or BFD is performed according to a configuration in the related art.

(1-2) If the measurement result of the neighboring cell is less than or equal to (for example, remains less than or equal to) the third threshold within the first preset time, the terminal performs the RLM measurement relaxation or the BFD detection relaxation; or, if the measurement result of the neighboring cell is greater than or equal to (for example, remains greater than or equal to) the fourth threshold within the second preset time, the terminal performs the normal RLM measurement or the normal BFD detection. That is, RLM or BFD is performed according to a configuration in the related art.

(1-3) If the measurement result of the current cell is greater than or equal to (for example, remains greater than or equal to) the third threshold within the first preset time and the measurement result of the neighboring cell remains less than or equal to the third threshold within the first preset time, the terminal performs the RLM measurement relaxation or the BFD detection relaxation; or, if the measurement result of the current cell is less than or equal to (for example, remains less than or equal to) the fourth threshold within the second preset time and the measurement result of the neighboring cell is greater than or equal to (for example, remains greater than or equal to) the fourth threshold within the second preset time, the terminal performs the normal RLM measurement or the normal BFD detection. That is, RLM or BFD is performed according to a configuration in the related art.

(2-0) If the measurement result of the beam is greater than or equal to (for example, remains greater than or equal to) the third threshold within the first preset time, the terminal performs the normal RLM measurement or the normal BFD detection; or, if the measurement result of the beam is less than or equal to (for example, remains less than or equal to) the fourth threshold within the second preset time, the terminal performs RLM measurement enhancement or BFD detection enhancement.

(2-1) If the measurement result of the current cell is greater than or equal to (for example, remains greater than or equal to) the third threshold within the first preset time, the terminal performs the normal RLM measurement or the normal BFD detection; or, if the measurement result of the current cell is less than or equal to (for example, remains less than or equal to) the fourth threshold within the second preset time, the terminal performs the RLM measurement enhancement or the BFD detection enhancement.

(2-2) If the measurement result of the neighboring cell is less than or equal to (for example, remains less than or equal to) the third threshold within the first preset time, the terminal performs the normal RLM measurement or the normal BFD detection; or, if the measurement result of the neighboring cell is greater than or equal to (for example, remains greater than or equal to) the fourth threshold within the second preset time, the terminal performs the RLM measurement enhancement or the BFD detection enhancement.

(2-3) If the measurement result of the current cell is greater than or equal to (for example, remains greater than or equal to) the third threshold within the first preset time and the measurement result of the neighboring cell is less than or equal to (for example, remains less than or equal to) the third threshold within the first preset time, the terminal performs the normal RLM measurement or the normal BFD detection; or, if the measurement result of the current cell is less than or equal to (for example, remains less than or equal to) the fourth threshold within the second preset time and the measurement result of the neighboring cell is greater than or equal to (for example, remains greater than or equal to) the fourth threshold within the second preset time, the terminal performs the RLM measurement enhancement or the BFD detection enhancement.

(3-0) If the measurement result of the beam is greater than or equal to (for example, remains greater than or equal to) the third threshold within the first preset time, the terminal performs the RLM measurement relaxation or the BFD detection relaxation; or, if the measurement result of the beam is less than or equal to (for example, remains less than or equal to) the fourth threshold within the second preset time, the terminal performs the RLM measurement enhancement or the BFD detection enhancement.

(3-1) If the measurement result of the current cell is greater than or equal to (for example, remains greater than or equal to) the third threshold within the first preset time, the terminal performs the RLM measurement relaxation or the BFD detection relaxation; or, if the measurement result of the current cell is less than or equal to (for example, remains less than or equal to) the fourth threshold within the second preset time, the terminal performs the RLM measurement enhancement or the BFD detection enhancement.

(3-2) If the measurement result of the neighboring cell is less than or equal to (for example, remains less than or equal to) the third threshold within the first preset time, the terminal performs the RLM measurement relaxation or the BFD detection relaxation; or, if the measurement result of the neighboring cell is greater than or equal to (for example, remains greater than or equal to) the fourth threshold within the second preset time, the terminal performs the RLM measurement enhancement or the BFD detection enhancement.

(3-3) If the measurement result of the current cell is greater than or equal to (for example, remains greater than or equal to) the third threshold within the first preset time and the measurement result of the neighboring cell is less than or equal to (for example, remains less than or equal to) the third threshold within the first preset time, the terminal performs the RLM measurement relaxation or the BFD detection relaxation; or, if the measurement result of the current cell is less than or equal to (for example, remains less than or equal to) the fourth threshold within the second preset time and the measurement result of the neighboring cell is greater than or equal to (for example, remains greater than or equal to) the fourth threshold within the second preset time, the terminal performs the RLM measurement enhancement or the BFD detection enhancement.

The foregoing third threshold and fourth threshold in (1-0) to (3-3) may be the same or different. Optionally, the fourth threshold is less than the third threshold.

Manner 2:

(1-0) If the measurement result of the beam is greater than or equal to the third threshold and the measurement result of the beam is not less than the fourth threshold within the first preset time, the terminal performs the RLM measurement relaxation or the BFD detection relaxation; or, if the measurement result of the beam is less than or equal to the fourth threshold and the measurement result of the beam is not greater than the third threshold within the second preset time, the terminal performs normal RLM measurement or normal BFD detection. That is, RLM or BFD is performed according to a configuration in the related art.

(1-1) If the measurement result of the current cell is greater than or equal to the third threshold and the measurement result of the current cell is not less than the fourth threshold within the first preset time, the terminal performs the RLM measurement relaxation or the BFD detection relaxation; or, if the measurement result of the current cell is less than or equal to the fourth threshold and the measurement result of the current cell is not greater than the third threshold within the second preset time, the terminal performs the normal RLM measurement or the normal BFD detection. That is, RLM or BFD is performed according to a configuration in the related art.

(1-2) If the measurement result of the neighboring cell is less than or equal to the third threshold and the measurement result of the neighboring cell is not greater than the fourth threshold within the first preset time, the terminal performs the RLM measurement relaxation or the BFD detection relaxation; or, if the measurement result of the neighboring cell is greater than or equal to the fourth threshold and the measurement result of the neighboring cell is not less than the third threshold within the second preset time, the terminal performs the normal RLM measurement or the normal BFD detection. That is, RLM or BFD is performed according to a configuration in the related art.

(1-3) If the measurement result of the current cell is greater than or equal to the third threshold, the measurement result of the current cell is not less than the fourth threshold within the first preset time, the measurement result of the neighboring cell is less than or equal to the third threshold, and the measurement result of the neighboring cell is not greater than the fourth threshold within the first preset time, the terminal performs the RLM measurement relaxation or the BFD detection relaxation; or, if the measurement result of the current cell is less than or equal to the fourth threshold, the measurement result of the current cell is not greater than the third threshold within the second preset time, the measurement result of the neighboring cell is greater than or equal to the fourth threshold, and the measurement result of the neighboring cell is not less than the third threshold within the second preset time, the terminal performs the normal RLM measurement or the normal BFD detection. That is, RLM or BFD is performed according to a configuration in the related art.

(2-0) If the measurement result of the beam is greater than or equal to the third threshold and the measurement result of the beam is not less than the fourth threshold within the first preset time, the terminal performs the normal RLM measurement or the normal BFD detection; or, if the measurement result of the beam is less than or equal to the fourth threshold and the measurement result of the beam is not greater than the third threshold within the second preset time, the terminal performs RLM measurement enhancement or BFD detection enhancement.

(2-1) If the measurement result of the current cell is greater than or equal to the third threshold and the measurement result of the current cell is not less than the fourth threshold within the first preset time, the terminal performs the normal RLM measurement or the normal BFD detection; or, if the measurement result of the current cell is less than or equal to the fourth threshold and the measurement result of the current cell is not greater than the third threshold within the second preset time, the terminal performs the RLM measurement enhancement or the BFD detection enhancement.

(2-2) If the measurement result of the neighboring cell is less than or equal to the third threshold and the measurement result of the neighboring cell is not greater than the fourth threshold within the first preset time, the terminal performs the normal RLM measurement or the normal BFD detection; or, if the measurement result of the neighboring cell is greater than or equal to the fourth threshold and the measurement result of the neighboring cell is not less than the third threshold within the second preset time, the terminal performs the RLM measurement enhancement or the BFD detection enhancement.

(2-3) If the measurement result of the current cell is greater than or equal to the third threshold, the measurement result of the current cell is not less than the fourth threshold within the first preset time, the measurement result of the neighboring cell is less than or equal to the third threshold, and the measurement result of the neighboring cell is not greater than the fourth threshold within the first preset time, the terminal performs the normal RLM measurement or the normal BFD detection; or, if the measurement result of the current cell is less than or equal to the fourth threshold, the measurement result of the current cell is not greater than the third threshold within the second preset time, the measurement result of the neighboring cell is greater than or equal to the fourth threshold, and the measurement result of the neighboring cell is not less than the third threshold within the second preset time, the terminal performs the RLM measurement enhancement or the BFD detection enhancement.

(3-0) If the measurement result of the beam is greater than or equal to the third threshold and the measurement result of the beam is not less than the fourth threshold within the first preset time, the terminal performs the RLM measurement relaxation or the BFD detection relaxation; or, if the measurement result of the beam is less than or equal to the fourth threshold and the measurement result of the beam is not greater than the third threshold within the second preset time, the terminal performs the RLM measurement enhancement or the BFD detection enhancement.

(3-1) If the measurement result of the current cell is greater than or equal to the third threshold and the measurement result of the current cell is not less than the fourth threshold within the first preset time, the terminal performs the RLM measurement relaxation or the BFD detection relaxation; or, if the measurement result of the current cell is less than or equal to the fourth threshold and the measurement result of the current cell is not greater than the third threshold within the second preset time, the terminal performs the RLM measurement enhancement or the BFD detection enhancement.

(3-2) If the measurement result of the neighboring cell is less than or equal to the third threshold and the measurement result of the neighboring cell is not greater than the fourth threshold within the first preset time, the terminal performs the RLM measurement relaxation or the BFD detection relaxation; or, if the measurement result of the neighboring cell is greater than or equal to the fourth threshold and the measurement result of the neighboring cell is not less than the third threshold within the second preset time, the terminal performs the RLM measurement enhancement or the BFD detection enhancement.

(3-3) If the measurement result of the current cell is greater than or equal to the third threshold, the measurement result of the current cell is not less than the fourth threshold within the first preset time, the measurement result of the neighboring cell is less than or equal to the third threshold, and the measurement result of the neighboring cell is not greater than the fourth threshold within the first preset time, the terminal performs the RLM measurement relaxation or the BFD detection relaxation; or, if the measurement result of the current cell is less than or equal to the fourth threshold, the measurement result of the current cell is not greater than the third threshold within the second preset time, the measurement result of the neighboring cell is greater than or equal to the fourth threshold, and the measurement result of the neighboring cell is not less than the third threshold within the second preset time, the terminal performs the RLM measurement enhancement or the BFD detection enhancement.

The foregoing third threshold and fourth threshold in (1-0) to (3-3) may be the same or different. The first preset time and the second preset time may be the same or different.

Further, the third threshold and/or fourth threshold may be the same as or different from the S-measure threshold in the related art. The S-measure threshold is used for determining in a connected state or an idle state whether to perform measurement on a neighboring cell or at another frequency.

Example 3

The parameters configured by the network side include one or more of the following: a parameter of a timer, a third preset time, a preset measurement period quantity, a preset detection period quantity, a preset measurement sample quantity, a preset detection sample quantity, and a parameter of a counter. It is determined according to the following rule whether to perform the RLM measurement or BFD detection adjustment.

Manner 1:

(1) If a time at which the terminal performs RLM measurement relaxation, RLM measurement enhancement, BFD detection relaxation or BFD detection enhancement reaches the third preset time, normal RLM measurement or normal BFD detection is performed.

(2) When the terminal starts to perform the RLM measurement relaxation, the RLM measurement enhancement, the BFD detection relaxation or the BFD detection enhancement, the timer is started, and when the timer expires, the normal RLM measurement or the normal BFD detection is performed.

Manner 2:

(1) If a measurement period quantity of performing the RLM measurement relaxation or the RLM measurement enhancement by the terminal reaches the preset measurement period quantity, the normal RLM measurement is performed.

(2) If a detection period quantity of performing the BFD detection relaxation or the BFD detection enhancement by the terminal reaches the preset detection period quantity, the normal BFD detection is performed.

(3) If a measurement sample (Sample) quantity of performing the RLM measurement relaxation or the RLM measurement enhancement by the terminal reaches the preset measurement sample quantity, the normal RLM measurement is performed.

(4) If a detection sample (Sample) quantity of performing the BFD detection relaxation or the BFD detection enhancement by the terminal reaches the preset detection sample quantity, the normal BFD detection is performed.

(5) When the terminal starts to perform the RLM measurement relaxation or the RLM measurement enhancement, the counter is started, a count value of the counter is adjusted according to a measurement period of the RLM measurement relaxation or the RLM measurement enhancement (for example, for each measurement period of the RLM measurement relaxation or the RLM measurement enhancement, the count value of the counter is increased by 1), and when the count value reaches a preset quantity, the normal RLM measurement is performed.

(6) When the terminal starts to perform the BFD detection relaxation or the BFD detection enhancement, the counter is started, a count value of the counter is adjusted according to a detection period of the BFD detection relaxation or the BFD detection enhancement (for example, for each detection period of the BFD detection relaxation or the BFD detection enhancement, the count value of the counter is increased by 1), and when the count value reaches a preset quantity, the normal BFD detection is performed.

(7) When the terminal starts to perform the RLM measurement relaxation or the RLM measurement enhancement, the counter is started, a count value of the counter is adjusted according to a measurement sample of the RLM measurement relaxation or the RLM measurement enhancement (for example, for each measurement sample of the RLM measurement relaxation or the RLM measurement enhancement, the count value of the counter is increased by 1), and when the count value reaches a preset quantity, the normal RLM measurement is performed.

(8) When the terminal starts to perform the BFD detection relaxation or the BFD detection enhancement, the counter is started, a count value of the counter according to a detection sample of the BFD detection relaxation or the BFD detection enhancement is adjusted (for example, for each detection sample of the BFD detection relaxation or the BFD detection enhancement, the count value of the counter is increased by 1), and when the count value reaches a preset quantity, the normal BFD detection is performed.

Example 4

The parameters configured by the network side include one or more of the following: a fourth preset time, a fifth threshold, a fifth preset time, and a sixth threshold (that is, it is equivalent to that the parameters configured by the network side include an adjustment determination threshold and a preset time). It is determined according to the following rule whether to perform the RLM measurement/BFD detection adjustment.

Manner 1:

(1-0) If a change in the measurement result of the beam within the fourth preset time is less than or equal to the fifth threshold (for example, or referred to as a delta threshold), the terminal performs the RLM measurement relaxation or the BFD detection relaxation; or, if a change in the measurement result of the beam within the fifth preset time is greater than or equal to (for example, remains greater than or equal to) the sixth threshold, the terminal performs normal RLM measurement or normal BFD detection. That is, RLM or BFD is performed according to a configuration in the related art.

(1-1) If a change in the measurement result of the current cell within the fourth preset time is less than or equal to the fifth threshold, the terminal performs the RLM measurement relaxation or the BFD detection relaxation; or, if a change in the measurement result of the current cell within the fifth preset time is greater than or equal to (for example, remains greater than or equal to) the sixth threshold, the terminal performs the normal RLM measurement or the normal BFD detection. That is, RLM or BFD is performed according to a configuration in the related art.

(1-2) If a change in the measurement result of the neighboring cell within the fourth preset time is greater than or equal to the fifth threshold, the terminal performs the RLM measurement relaxation or the BFD detection relaxation; or, if a change in the measurement result of the neighboring cell within the fifth preset time is less than or equal to (for example, remains less than or equal to) the sixth threshold, the terminal performs the normal RLM measurement or the normal BFD detection.

(1-3) If the change in the measurement result of the current cell within the fourth preset time is less than or equal to the fifth threshold and the change in the measurement result of the neighboring cell within the fourth preset time is greater than or equal to the fifth threshold, the terminal performs the RLM measurement relaxation or the BFD detection relaxation; or, if the change in the measurement result of the current cell within the fifth preset time is greater than or equal to (for example, remains greater than or equal to) the sixth threshold and the change in the measurement result of the neighboring cell within the fifth preset time is less than or equal to (for example, remains less than or equal to) the sixth threshold, the terminal performs the normal RLM measurement or the normal BFD detection.

(2-0) If the change in the measurement result of the beam within the fourth preset time is less than or equal to the fifth threshold, the terminal performs the normal RLM measurement or the normal BFD detection; or, if the change in the measurement result of the beam within the fifth preset time is greater than or equal to the sixth threshold, the terminal performs RLM measurement enhancement or BFD detection enhancement.

(2-1) If the change in the measurement result of the current cell within the fourth preset time is less than or equal to the fifth threshold, the terminal performs the normal RLM measurement or the normal BFD detection; or, if the change in the measurement result of the current cell within the fifth preset time is greater than or equal to the sixth threshold, the terminal performs the RLM measurement enhancement or the BFD detection enhancement.

(2-2) If the change in the measurement result of the neighboring cell within the fourth preset time is greater than or equal to the fifth threshold, the terminal performs the normal RLM measurement or the normal BFD detection; or, if the change in the measurement result of the neighboring cell within the fifth preset time is less than or equal to the sixth threshold, the terminal performs the RLM measurement enhancement or the BFD detection enhancement.

(2-3) If the change in the measurement result of the current cell within the fourth preset time is less than or equal to the fifth threshold and the change in the measurement result of the neighboring cell within the fourth preset time is greater than or equal to the fifth threshold, the terminal performs the normal RLM measurement or the normal BFD detection; or, if the change in the measurement result of the current cell within the fifth preset time is greater than or equal to the sixth threshold and the change in the measurement result of the neighboring cell within the fifth preset time is less than or equal to the sixth threshold, the terminal performs the RLM measurement enhancement or the BFD detection enhancement.

(3-0) If the change in the measurement result of the beam within the fourth preset time is less than or equal to the fifth threshold, the terminal performs the RLM measurement relaxation or the BFD detection relaxation; or, if the change in the measurement result of the beam within the fifth preset time is greater than or equal to the sixth threshold, the terminal performs the RLM measurement enhancement or the BFD detection enhancement.

(3-1) If the change in the measurement result of the current cell within the fourth preset time is less than or equal to the fifth threshold, the terminal performs the RLM measurement relaxation or the BFD detection relaxation; or, if the change in the measurement result of the current cell within the fifth preset time is greater than or equal to the sixth threshold, the terminal performs the RLM measurement enhancement or the BFD detection enhancement.

(3-2) If the change in the measurement result of the neighboring cell within the fourth preset time is greater than or equal to the fifth threshold, the terminal performs the RLM measurement relaxation or the BFD detection relaxation; or, if the change in the measurement result of the neighboring cell within the fifth preset time is less than or equal to the sixth threshold, the terminal performs the RLM measurement enhancement or the BFD detection enhancement.

(3-3) If the change in the measurement result of the current cell within the fourth preset time is less than or equal to the fifth threshold and the change in the measurement result of the neighboring cell within the fourth preset time is greater than or equal to the fifth threshold, the terminal performs the RLM measurement relaxation or the BFD detection relaxation; or, if the change in the measurement result of the current cell within the fifth preset time is greater than or equal to the sixth threshold and the change in the measurement result of the neighboring cell within the fifth preset time is less than or equal to the sixth threshold, the terminal performs the RLM measurement enhancement or the BFD detection enhancement.

Manner 2:

(1-0) If a change in the measurement result of the beam within the fourth preset time is less than or equal to the fifth threshold and a change in the measurement result of the beam within the fifth preset time is not greater than or equal to the sixth threshold, the terminal performs the RLM measurement relaxation or the BFD detection relaxation; or, if the change in the measurement result of the beam within the fourth preset time is greater than or equal to the fifth threshold and the change in the measurement result of the beam within the fifth preset time is not less than or equal to the sixth threshold, the terminal performs normal RLM measurement or normal BFD detection. That is, RLM or BFD is performed according to a configuration in the related art.

(1-1) If a change in the measurement result of the current cell within the fourth preset time is less than or equal to the fifth threshold and a change in the measurement result of the current cell within the fifth preset time is not greater than or equal to the sixth threshold, the terminal performs the RLM measurement relaxation or the BFD detection relaxation; or, if the change in the measurement result of the current cell within the fourth preset time is greater than or equal to the fifth threshold and the change in the measurement result of the current cell within the fifth preset time is not less than or equal to the sixth threshold, the terminal performs the normal RLM measurement or the normal BFD detection. That is, RLM or BFD is performed according to a configuration in the related art.

(1-2) If a change in the measurement result of the neighboring cell within the fourth preset time is greater than or equal to the fifth threshold and a change in the measurement result of the neighboring cell within the fifth preset time is not less than or equal to the sixth threshold, the terminal performs the RLM measurement relaxation or the BFD detection relaxation; or, if the change in the measurement result of the neighboring cell within the fourth preset time is less than or equal to the fifth threshold and the change in the measurement result of the neighboring cell within the fifth preset time is not greater than or equal to the sixth threshold, the terminal performs the normal RLM measurement or the normal BFD detection. That is, RLM or BFD is performed according to a configuration in the related art.

(1-3) If the change in the measurement result of the current cell within the fourth preset time is less than or equal to the fifth threshold, the change in the measurement result of the current cell within the fifth preset time is not greater than or equal to the sixth threshold, the change in the measurement result of the neighboring cell within the fourth preset time is greater than or equal to the fifth threshold, and the change in the measurement result of the neighboring cell within the fifth preset time is not less than or equal to the sixth threshold, the terminal performs the RLM measurement relaxation or the BFD detection relaxation; or, if the change in the measurement result of the current cell within the fourth preset time is greater than or equal to the fifth threshold, the change in the measurement result of the current cell within the fifth preset time is not less than or equal to the sixth threshold, the change in the measurement result of the neighboring cell within the fourth preset time is less than or equal to the fifth threshold, and the change in the measurement result of the neighboring current cell within the fifth preset time is not greater than or equal to the sixth threshold, the terminal performs the normal RLM measurement or the normal BFD detection. That is, RLM or BFD is performed according to a configuration in the related art.

(2-0) If the change in the measurement result of the beam within the fourth preset time is less than or equal to the fifth threshold and the change in the measurement result of the beam within the fifth preset time is greater than or equal to the sixth threshold, the terminal performs the normal RLM measurement or the normal BFD detection; or, if the change in the measurement result of the beam within the fourth preset time is greater than or equal to the fifth threshold and a change in the measurement result of the beam within the sixth preset time is less than or equal to the sixth threshold, the terminal performs RLM measurement enhancement or BFD detection enhancement.

(2-1) If the change in the measurement result of the current cell within the fourth preset time is less than or equal to the fifth threshold and the change in the measurement result of the current cell within the fifth preset time is greater than or equal to the sixth threshold, the terminal performs the normal RLM measurement or the normal BFD detection; or, if the change in the measurement result of the current cell within the fourth preset time is greater than or equal to the fifth threshold and a change in the measurement result of the current cell within the sixth preset time is less than or equal to the sixth threshold, the terminal performs the RLM measurement enhancement or the BFD detection enhancement.

(2-2) If the change in the measurement result of the neighboring cell within the fourth preset time is greater than or equal to the fifth threshold and the change in the measurement result of the neighboring cell within the fifth preset time is less than or equal to the sixth threshold, the terminal performs the normal RLM measurement or the normal BFD detection; or, if the change in the measurement result of the neighboring cell within the fourth preset time is less than or equal to the fifth threshold and a change in the measurement result of the neighboring cell within the sixth preset time is greater than or equal to the sixth threshold, the terminal performs the RLM measurement enhancement or the BFD detection enhancement.

(2-3) If the change in the measurement result of the current cell within the fourth preset time is less than or equal to the fifth threshold, the change in the measurement result of the current cell within the fifth preset time is greater than or equal to the sixth threshold, the change in the measurement result of the neighboring cell within the fourth preset time is greater than or equal to the fifth threshold, and the change in the measurement result of the neighboring cell within the fifth preset time is less than or equal to the sixth threshold, the terminal performs the normal RLM measurement or the normal BFD detection; or, if the change in the measurement result of the current cell within the fourth preset time is greater than or equal to the fifth threshold, the change in the measurement result of the current cell within the sixth preset time is less than or equal to the sixth threshold, the change in the measurement result of the neighboring cell within the fourth preset time is less than or equal to the fifth threshold, and the change in the measurement result of the neighboring cell within the sixth preset time is greater than or equal to the sixth threshold, the terminal performs the RLM measurement enhancement or the BFD detection enhancement.

(3-0) If the change in the measurement result of the beam within the fourth preset time is less than or equal to the fifth threshold and the change in the measurement result of the beam within the fifth preset time is not greater than or equal to the sixth threshold, the terminal performs the RLM measurement relaxation or the BFD detection relaxation; or, if the change in the measurement result of the beam within the fourth preset time is greater than or equal to the fifth threshold and the change in the measurement result of the beam within the fifth preset time is not less than or equal to the sixth threshold, the terminal performs the RLM measurement enhancement or the BFD detection enhancement.

(3-1) If the change in the measurement result of the current cell within the fourth preset time is less than or equal to the fifth threshold and the change in the measurement result of the current cell within the fifth preset time is not greater than or equal to the sixth threshold, the terminal performs the RLM measurement relaxation or the BFD detection relaxation; or, if the change in the measurement result of the current cell within the fourth preset time is greater than or equal to the fifth threshold and the change in the measurement result of the current cell within the fifth preset time is not less than or equal to the sixth threshold, the terminal performs the RLM measurement enhancement or the BFD detection enhancement.

(3-2) If the change in the measurement result of the neighboring cell within the fourth preset time is greater than or equal to the fifth threshold and the change in the measurement result of the neighboring cell within the fifth preset time is not less than or equal to the sixth threshold, the terminal performs the RLM measurement relaxation or the BFD detection relaxation; or, if the change in the measurement result of the neighboring cell within the fourth preset time is less than or equal to the fifth threshold and the change in the measurement result of the neighboring cell within the fifth preset time is not greater than or equal to the sixth threshold, the terminal performs the RLM measurement enhancement or the BFD detection enhancement.

(3-3) If the change in the measurement result of the current cell within the fourth preset time is less than or equal to the fifth threshold, the change in the measurement result of the current cell within the fifth preset time is not greater than or equal to the sixth threshold, the change in the measurement result of the neighboring cell within the fourth preset time is greater than or equal to the fifth threshold, and the change in the measurement result of the neighboring cell within the fifth preset time is not less than or equal to the sixth threshold, the terminal performs the RLM measurement relaxation or the BFD detection relaxation; or, if the change in the measurement result of the current cell within the fourth preset time is greater than or equal to the fifth threshold, the change in the measurement result of the current cell within the fifth preset time is not less than or equal to the sixth threshold, the change in the measurement result of the neighboring cell within the fourth preset time is less than or equal to the fifth threshold, and the change in the measurement result of the neighboring cell within the fifth preset time is not greater than or equal to the sixth threshold, the terminal performs the RLM measurement enhancement or the BFD detection enhancement.

The foregoing fifth threshold and sixth threshold in (1-0) to (3-3) may be the same or different. The fourth preset time and the fifth preset time may be the same or different.

Further, the fifth threshold and/or sixth threshold may be the same as or different from the S-measure threshold in the related art. The S-measure threshold is used for determining in a connected state or an idle state whether to perform measurement on a neighboring cell or at another frequency.

Example 5: Obtain Status Information or Environment Information or Network Coverage Information of UE, and Perform RLM Measurement and/or BFD Detection Adjustment According to the Information If the terminal has entered a coverage area of a corresponding cell or beam (beam), RLM measurement relaxation, RLM measurement enhancement, BFD detection relaxation or BFD detection enhancement is performed.

If the terminal has left a coverage area of a corresponding cell or beam, normal RLM measurement or normal BFD detection is performed.

In the embodiments of the present disclosure, it may be determined, according to information related to a terminal (for example, a measurement result of the terminal, status information of the terminal, environment information, and network coverage information) and/or parameters configured by a network side, whether it is necessary to perform RLM measurement adjustment and/or BFD detection adjustment, to avoid the problem that the terminal still needs to wake up to perform RLM and/or BFD even if there is DCI or an advance indication signal indicating that the terminal does not need to monitor a PDCCH, thereby saving the power of the terminal.

Figure 4:
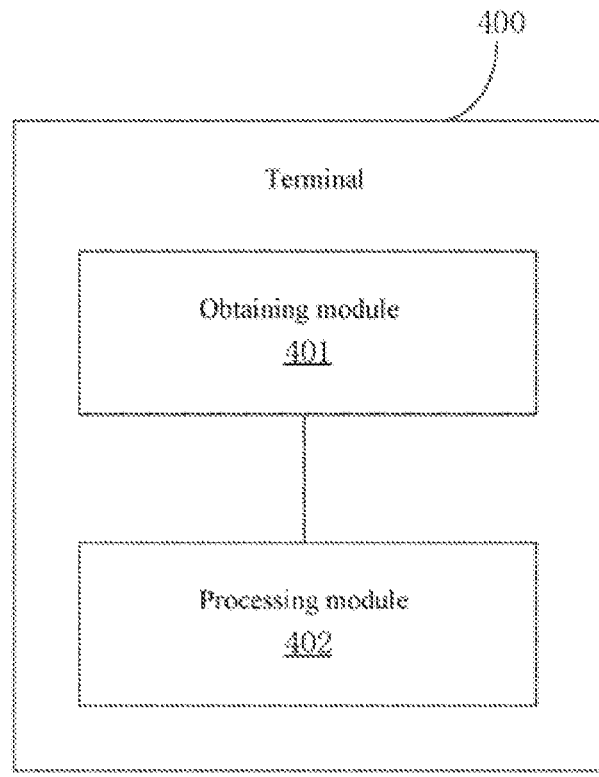
FIG. 4 is a schematic structural diagram 1 of a terminal according to an embodiment of the present disclosure.

Referring to FIG. 4, an embodiment of the present disclosure further provides a terminal. The terminal 400 includes:

an obtaining module 401, configured to obtain first information and/or parameters configured by a network side, the first information including one or more of the following: a measurement result of the terminal, status information of the terminal, environment information, and network coverage information; and a processing module 402, configured to determine, according to the first information and/or the parameters configured by the network side, whether to perform RLM measurement and/or BFD detection adjustment.

In some implementations, the processing module 402 is further configured to:

determine, according to a measurement result of a beam and a preset threshold, whether to perform the RLM measurement adjustment and/or BFD detection adjustment;

or determine, according to measurement results of a current cell and/or a neighboring cell and a preset threshold, whether to perform the RLM measurement adjustment and/or BFD detection adjustment.

In some implementations, the processing module 402 is further configured to:

if the measurement result of the beam and the preset threshold satisfy a first condition, perform RLM measurement relaxation and/or BFD detection relaxation;

or if the measurement result of the beam and the preset threshold satisfy a second condition, perform normal RLM measurement and/or normal BFD detection;

or if the measurement result of the beam and the preset threshold satisfy a third condition, perform RLM measurement enhancement and/or BFD detection enhancement.

In some implementations, the first condition includes one of the following:

the measurement result of the beam is greater than or equal to a first threshold;

the measurement result of the beam is greater than or equal to the first threshold within a first preset time;

the measurement result of the beam remains greater than or equal to the first threshold within the first preset time;

the measurement result of the beam is greater than or equal to the first threshold, and the measurement result of the beam is not less than a second threshold within a second preset time;

the measurement result of the beam is greater than or equal to the first threshold, and the measurement result of the beam remains not less than the second threshold within the second preset time;

a change in the measurement result of the beam within a third preset time is less than or equal to a third threshold;

the change in the measurement result of the beam within the third preset time is less than or equal to the third threshold, and a change in the measurement result of the current cell within a fourth preset time is greater than or equal to a fourth threshold; and the change in the measurement result of the beam within the third preset time is less than or equal to the third threshold, and no change in the measurement result of the beam within a fifth preset time is greater than or equal to a fifth threshold;

or the second condition includes one of the following:

the measurement result of the beam is less than or equal to or greater than a sixth threshold;

the measurement result of the beam is less than or equal to or greater than the sixth threshold within a sixth preset time;

the measurement result of the beam remains less than or equal to or greater than the sixth threshold within the sixth preset time;

the measurement result of the beam is less than or equal to or greater than the sixth threshold, and the measurement result of the beam is not greater than or not less than a seventh threshold within a seventh preset time;

the measurement result of the beam is less than or equal to or greater than the sixth threshold, and the measurement result of the beam remains not greater than or not less than an eighth threshold within an eighth preset time;

a change in the measurement result of the beam within a ninth preset time is less than or equal to or greater than a ninth threshold;

a change in the measurement result of the beam within a tenth preset time is greater than or equal to a tenth threshold, and no change in the measurement result of the beam within an eleventh preset time is less than or equal to an eleventh threshold; and a change in the measurement result of the beam within a twelfth preset time is less than or equal to a twelfth threshold, and a change in the measurement result of the beam within a thirteenth preset time is greater than or equal to a thirteenth threshold;

or the third condition includes one of the following:

the measurement result of the beam is less than or equal to a fourteenth threshold;

the measurement result of the beam is less than or equal to the fourteenth threshold within a fourteenth preset time;

the measurement result of the beam remains less than or equal to the fourteenth threshold within the fourteenth preset time;

the measurement result of the beam is less than or equal to the fourteenth threshold, and the measurement result of the beam or the current cell is not less than or not greater than a fifteenth threshold within a fifteenth preset time;

the measurement result of the beam is less than or equal to the fourteenth threshold, and the measurement result of the beam or the current cell remains not less than or not greater than the fifteenth threshold within the fifteenth preset time;

a change in the measurement result of the beam within a sixteenth preset time is greater than or equal to a sixteenth threshold;

the change in the measurement result of the beam within the sixteenth preset time is greater than or equal to the sixteenth threshold, and a change in the measurement result of the beam within a seventeenth preset time is less than or equal to a seventeenth threshold; and the change in the measurement result of the beam within the sixteenth preset time is greater than or equal to the sixteenth threshold, and no change in the measurement result of the beam within an eighteenth preset time is less than or equal to an eighteenth threshold.

In some implementations, the processing module 402 is further configured to:

if the measurement result of the current cell and the preset threshold satisfy a fourth condition, and/or if the measurement result of the neighboring cell and the preset threshold satisfy a fifth condition, perform RLM measurement relaxation and/or BFD detection relaxation;

or if the measurement result of the current cell and the preset threshold satisfy a sixth condition, and/or if the measurement result of the neighboring cell and the preset threshold satisfy a seventh condition, perform normal RLM measurement and/or normal BFD detection;

or if the measurement result of the current cell and the preset threshold satisfy an eighth condition, and/or if the measurement result of the neighboring cell and the preset threshold satisfy a ninth condition, perform RLM measurement enhancement and/or BFD detection enhancement.

In some implementations, the fourth condition includes one of the following:

the measurement result of the current cell is greater than or equal to a nineteenth threshold;

the measurement result of the current cell is greater than or equal to the nineteenth threshold within a nineteenth preset time;

the measurement result of the current cell remains greater than or equal to the nineteenth threshold within the nineteenth preset time;

the measurement result of the current cell is greater than or equal to the nineteenth threshold, and the measurement result of the current cell is not less than a twentieth threshold within a twentieth preset time;

the measurement result of the current cell is greater than or equal to the nineteenth threshold, and the measurement result of the current cell remains not less than the twentieth threshold within the twentieth preset time;

a change in the measurement result of the current cell within a twenty-first preset time is less than or equal to a twenty-first threshold;

the change in the measurement result of the current cell within the twenty-first preset time is less than or equal to the twenty-first threshold, and a change in the measurement result of the current cell within a twenty-second preset time is not greater than or equal to a twenty-second threshold; and the change in the measurement result of the current cell within the twenty-first preset time is less than or equal to the twenty-first threshold, and a change in the measurement result of the current cell within a twenty-third preset time is greater than or equal to a twenty-third threshold;

or the sixth condition includes one of the following:

the measurement result of the current cell is less than or equal to or greater than a twenty-fourth threshold;

the measurement result of the current cell is less than or equal to or greater than the twenty-fourth threshold within a twenty-fourth preset time;

the measurement result of the current cell remains less than or equal to or greater than the twenty-fourth threshold within the twenty-fourth preset time;

the measurement result of the current cell is less than or equal to or greater than the twenty-fourth threshold, and the measurement result of the current cell is not greater than or not less than a twenty-fifth threshold within a twenty-fifth preset time;

the measurement result of the current cell is less than or equal to or greater than the twenty-fourth threshold, and the measurement result of the current cell remains not greater than or not less than the twenty-fifth threshold within the twenty-fifth preset time;

a change in the measurement result of the current cell within a twenty-sixth preset time is greater than or equal to or less than a twenty-sixth threshold;

the change in the measurement result of the current cell within the twenty-sixth preset time is greater than or equal to the twenty-sixth threshold, and no change in the measurement result of the current cell within a twenty-seventh preset time is less than or equal to a twenty-seventh threshold; and the change in the measurement result of the current cell within the twenty-sixth preset time is greater than or equal to the twenty-sixth threshold, and a change in the measurement result of the current cell within a twenty-eighth preset time is greater than or equal to a twenty-eighth threshold;

or the eighth condition includes one of the following:

the measurement result of the current cell is less than or equal to a twenty-ninth threshold;

the measurement result of the current cell is less than or equal to the twenty-ninth threshold within a twenty-ninth preset time;

the measurement result of the current cell remains less than or equal to the twenty-ninth threshold within the twenty-ninth preset time;

the measurement result of the current cell is less than or equal to the twenty-ninth threshold, and the measurement result of the current cell is not less than or not greater than a thirtieth threshold within a thirtieth preset time;

the measurement result of the current cell is less than or equal to the twenty-ninth threshold, and the measurement result of the current cell remains not less than or not greater than the thirtieth threshold within the thirtieth preset time;

a change in the measurement result of the current cell within a thirty-first preset time is greater than or equal to a thirty-first threshold;

the change in the measurement result of the current cell within the thirty-first preset time is greater than or equal to the thirty-first threshold, and a change in the measurement result of the current cell within a thirty-second preset time is less than or equal to a thirty-second threshold; and the change in the measurement result of the current cell within the thirty-first preset time is greater than or equal to the thirty-first threshold, and no change in the measurement result of the current cell within the thirty-second preset time is less than or equal to the thirty-second threshold.

In some implementations, the fifth condition includes one of the following:

the measurement result of the neighboring cell is less than or equal to a thirty-third threshold;

the measurement result of the neighboring cell is less than or equal to the thirty-third threshold within a thirty-third preset time;

the measurement result of the neighboring cell remains less than or equal to the thirty-third threshold within the thirty-third preset time;

the measurement result of the neighboring cell is less than or equal to the thirty-third threshold, and the measurement result of the neighboring cell is not greater than a thirty-fourth threshold within a thirty-fourth preset time;

the measurement result of the neighboring cell is less than or equal to the thirty-third threshold, and the measurement result of the neighboring cell remains not greater than the thirty-fourth threshold within the thirty-fourth preset time;

a change in the measurement result of the neighboring cell within a thirty-fifth preset time is greater than or equal to a thirty-fifth threshold;

the change in the measurement result of the neighboring cell within the thirty-fifth preset time is greater than or equal to the thirty-fifth threshold, and no change in the measurement result of the neighboring cell within a thirty-sixth preset time is less than or equal to a thirty-sixth threshold; and the change in the measurement result of the neighboring cell within the thirty-fifth preset time is greater than or equal to the thirty-fifth threshold, and a change in the measurement result of the neighboring cell within a thirty-seventh preset time is less than or equal to a thirty-seventh threshold;

or the seventh condition includes one of the following:

the measurement result of the neighboring cell is greater than or equal to or less than a thirty-eighth threshold;

the measurement result of the neighboring cell is greater than or equal to or less than the thirty-eighth threshold within a thirty-eighth preset time;

the measurement result of the neighboring cell remains greater than or equal to or less than the thirty-eighth threshold within the thirty-eighth preset time;

the measurement result of the neighboring cell is greater than or equal to or less than the thirty-eighth threshold, and the measurement result of the neighboring cell is not less than or not greater than a thirty-ninth threshold within a thirty-ninth preset time;

the measurement result of the neighboring cell is greater than or equal to or less than the thirty-eighth threshold, and the measurement result of the neighboring cell remains not less than or not greater than the thirty-ninth threshold within the thirty-ninth preset time;

a change in the measurement result of the neighboring cell within a fortieth preset time is less than or equal to or greater than a fortieth threshold;

the change in the measurement result of the neighboring cell within the fortieth preset time is less than or equal to the fortieth threshold, and no change in the measurement result of the neighboring cell within a forty-first preset time is greater than or equal to a forty-first threshold; and the change in the measurement result of the neighboring cell within the fortieth preset time is less than or equal to the fortieth threshold, and a change in the measurement result of the neighboring cell within a forty-second preset time is less than or equal to a forty-second threshold; and or the ninth condition includes one of the following:

the measurement result of the neighboring cell is greater than or equal to a forty-third threshold;

the measurement result of the neighboring cell is greater than or equal to the forty-third threshold within a forty-third preset time;

the measurement result of the neighboring cell remains greater than or equal to the forty-third threshold within the forty-third preset time;

the measurement result of the neighboring cell is greater than or equal to the forty-third threshold, and the measurement result of the neighboring cell is not greater than or not less than a forty-fourth threshold within a forty-fourth preset time;

the measurement result of the neighboring cell is greater than or equal to the forty-third threshold, and the measurement result of the neighboring cell remains not greater than or not less than the forty-fourth threshold within the forty-fourth preset time;

a change in the measurement result of the neighboring cell within a forty-fifth preset time is less than or equal to a forty-fifth threshold;

the change in the measurement result of the neighboring cell within the forty-fifth preset time is less than or equal to the forty-fifth threshold, and a change in the measurement result of the neighboring cell within a forty-sixth preset time is greater than or equal to a forty-sixth threshold; and the change in the measurement result of the neighboring cell within the forty-fifth preset time is less than or equal to the forty-fifth threshold, and no change in the measurement result of the neighboring cell within a forty-seventh preset time is greater than or equal to a forty-seventh threshold.

In some embodiments, one or more preset thresholds corresponding to the measurement result of the beam are the same as or different from a threshold for determining in a connected state or an idle state whether to perform measurement on a neighboring cell or at another frequency;

or one or more preset thresholds corresponding to the measurement result of the current cell are the same as or different from a threshold for determining in a connected state or an idle state whether to perform measurement on a neighboring cell or at another frequency;

or one or more preset thresholds corresponding to the measurement result of the neighboring cell are the same as or different from a threshold for determining in a connected state or an idle state whether to perform measurement on a neighboring cell or at another frequency.

In some implementations, the parameters configured by the network side include one or more of the following: a parameter of a timer, a third preset time, a preset measurement period quantity, a preset detection period quantity, a preset measurement sample quantity, a preset detection sample quantity, and a parameter of a counter; and In some implementations, the processing module 402 is further configured to perform one or more of the following:
- if a time at which the terminal performs RLM measurement relaxation, RLM measurement enhancement, BFD detection relaxation or BFD detection enhancement reaches the third preset time, performing normal RLM measurement or normal BFD detection;
- when the terminal starts to perform the RLM measurement relaxation, the RLM measurement enhancement, the BFD detection relaxation or the BFD detection enhancement, starting the timer, and when the timer expires, performing the normal RLM measurement or the normal BFD detection;
- if a measurement period quantity of performing the RLM measurement relaxation or the RLM measurement enhancement by the terminal reaches the preset measurement period quantity, performing the normal RLM measurement;
- if a detection period quantity of performing the BFD detection relaxation or the BFD detection enhancement by the terminal reaches the preset detection period quantity, performing the normal BFD detection;
- if a measurement sample quantity of performing the RLM measurement relaxation or the RLM measurement enhancement by the terminal reaches the preset measurement sample quantity, performing the normal RLM measurement;
- if a detection sample quantity of performing the BFD detection relaxation or the BFD detection enhancement by the terminal reaches the preset detection sample quantity, performing the normal BFD detection;
- when the terminal starts to perform the RLM measurement relaxation or the RLM measurement enhancement, starting the counter, adjusting a count value of the counter according to a measurement period of the RLM measurement relaxation or the RLM measurement enhancement, and when the count value reaches a preset quantity, performing the normal RLM measurement;
- when the terminal starts to perform the BFD detection relaxation or the BFD detection enhancement, starting the counter, adjusting a count value of the counter according to a detection period of the BFD detection relaxation or the BFD detection enhancement, and when the count value reaches a preset quantity, performing the normal BFD detection;
- when the terminal starts to perform the RLM measurement relaxation or the RLM measurement enhancement, starting the counter, adjusting a count value of the counter according to a measurement sample of the RLM measurement relaxation or the RLM measurement enhancement, and when the count value reaches a preset quantity, performing the normal RLM measurement; and
- when the terminal starts to perform the BFD detection relaxation or the BFD detection enhancement, starting the counter, adjusting a count value of the counter according to a detection sample of the BFD detection relaxation or the BFD detection enhancement, and when the count value reaches a preset quantity, performing the normal BFD detection.

In some implementations, the processing module 402 is further configured to:
- if it is determined according to the first information that the terminal has entered a coverage area of a corresponding cell or beam, perform RLM measurement relaxation, RLM measurement enhancement, BFD detection relaxation or BFD detection enhancement; or
- if it is determined according to the first information that the terminal has left a coverage area of a corresponding cell or beam, perform normal RLM measurement or normal BFD detection.

In some implementations, the parameters configured by the network side are configured in at least one manner in the following:
- the network side configures the corresponding parameters for each terminal;
- the network side configures the corresponding parameters for each cell;
- the network side configures the corresponding parameters for each frequency, carrier, band or bandwidth part;
- the network side configures the corresponding parameters for each frequency, carrier, band or bandwidth part of each terminal; and
- the network side configures the corresponding parameters for each beam.

In some implementations, the terminal 400 further includes: a sending module, configured to send a request message to the network side, the request message being used for requesting the network side to configure the parameters configured by the network side, or the request message indicating that the terminal needs to perform RLM measurement relaxation, RLM measurement enhancement, normal RLM measurement, BFD detection relaxation, BFD detection enhancement or normal BFD detection.

The terminal provided in the embodiments of the present disclosure may perform the foregoing method embodiments shown in FIG. 3. Their implementation principles and technical effects are similar. Details are not described herein again.

Figure 5:
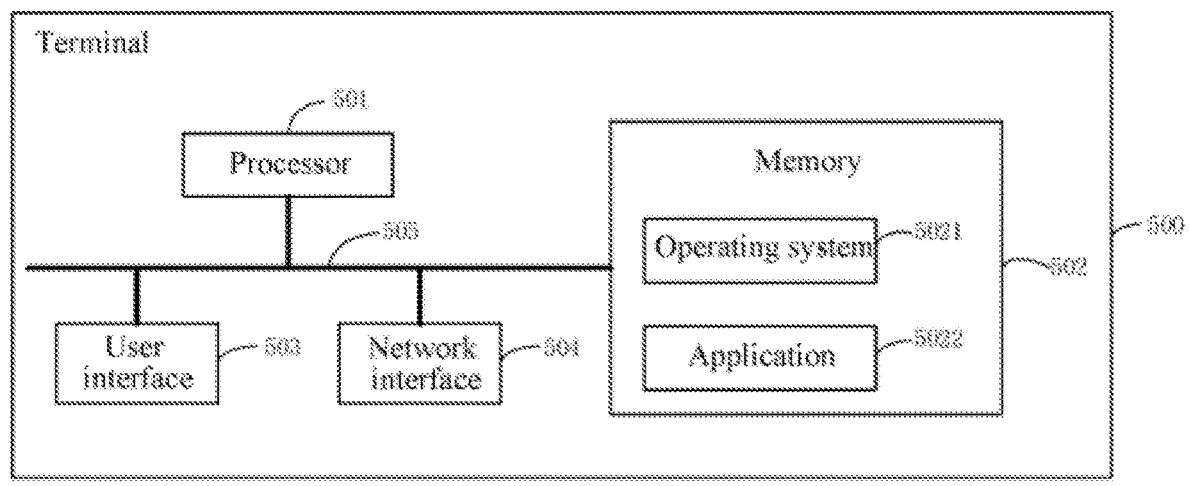
FIG. 5 is a schematic structural diagram 2 of a terminal according to an embodiment of the present disclosure.

As shown in FIG. 5, the terminal 500 shown in FIG. 5 includes at least one processor 501, a memory 502, at least one network interface 504, and a user interface 503. All the components in the terminal 500 are coupled together by a bus system 505. It may be understood that the bus system 505 is configured to implement connection and communication between the components. In addition to a data bus, the bus system 505 further includes a power bus, a control bus, and a status signal bus. However, for ease of clear description, all types of buses are marked as the bus system 505 in FIG. 5.

The user interface 503 may include a display, a keyboard or a clicking device (for example, a mouse), a trackball, a touch panel or a touchscreen, and the like.

It may be understood that, the memory 502 in this embodiment of the present disclosure may be a volatile memory or a non-volatile memory, or may include both a volatile memory and a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data rate SDRAM, DDR SDRAM), an enhanced synchronous dynamic random access memory (Enhanced SDRAM, ESDRAM), a synch-link dynamic random access memory (Synchlink DRAM, SLDRAM) and a direct rambus random access memory (Direct Rambus RAM, DR RAM). The memory 502 in the system and method described in the embodiments of the present disclosure includes, but is not limited to these memories and any other suitable types.

In some implementations, the memory 502 stores the following element, executable module, or data structure, or a subset thereof, or an extension set thereof: an operating system 5021 and an application 5022.

The operating system 5021 includes various system programs, for example, a frame layer, a core library layer, and a drive layer, used for implementing various basic services and processing tasks based on hardware. The application program 5022 includes various application programs such as a media player, a browser, and the like, used for implementing various application services. A program for implementing the method of the embodiments of the present disclosure may be included in the application 5022.

In an embodiment of the present disclosure, a program or an instruction stored in the memory 502 is invoked, specifically, a program or an instruction stored in the application program 5022 may be invoked, and is executed to implement the steps in the foregoing method shown in FIG. 3.

The terminal provided in the embodiments of the present disclosure may perform the foregoing method embodiments shown in FIG. 3. Their implementation principles and technical effects are similar. Details are not described herein again.

Steps of the methods or algorithms described with reference to the content disclosed in the present disclosure may be implemented by hardware, or may be implemented by a processor executing a software instruction. The software instruction may include a corresponding software module. The software module may be stored in a random access memory (RAM), a flash memory, a read-only memory (ROM), an erasable programmable read only memory (Erasable PROM, EPROM), an electrically erasable programmable read only memory (Electrically EPROM, EEPROM), a register, a hard disk, a mobile hard disk, a compact disc read-only memory, or a storage medium in any other forms well-known in the art. For example, a storage medium is coupled to a processor, so that the processor can read information from the storage medium or write information into the storage medium. Certainly, the storage medium may be a component of the processor. The processor and the storage medium may be carried in an application specific integrated circuit (ASIC). In addition, the ASIC may be carried in a core network interface device. Certainly, the processor and the storage medium may exist in the core network interface device as discrete components.

A person skilled in the art should be aware of that in the one or more examples, the functions described in the present disclosure may be implemented by hardware, software, firmware, or a combination of the above. When implemented by using software, the functions can be stored in a computer-readable medium or can be used as one or more instructions or code in a computer-readable medium for transferring. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing specific implementations further describe the objectives, technical solutions in detail, and beneficial effects of the present disclosure. It should be appreciated that the foregoing descriptions are merely specific implementations of the present disclosure, but are not intended to limit the protection scope of the present disclosure. Any modification, equivalent replacement, or improvement made based on the technical solutions of the present disclosure should fall within the protection scope of the present disclosure.

A person skilled in the art should understand that the embodiments of the present disclosure may be provided as a method, a system, or a computer program product. Therefore, the embodiments of the present disclosure may use a form of hardware-only embodiments, software-only embodiments, or embodiments with a combination of software and hardware. In addition, the embodiments of the present disclosure may use a form of a computer program product implemented on one or more computer-usable storage media (including but not limited to a disk memory, a CD-ROM, an optical memory, and the like) including computer-usable program code.

The embodiments of the present disclosure are described with reference to the flowcharts and/or block diagrams of the method, the device (system), and the computer program product according to the embodiments of the present disclosure. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may be alternatively stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of the present disclosure without departing from the spirit and scope of the present disclosure. In this case, if the modifications and variations made to the embodiments of the present disclosure fall within the scope of the claims of the present disclosure and equivalent technologies thereof, the present disclosure also intends to include these changes and variations.

What is claimed is:

1. A Radio Link Monitor (RLM) adjustment and/or Beam Failure Detection (BFD) adjustment method, applied to a terminal in a connected state, and comprising:
   obtaining first information, the first information comprising: a measurement result of the terminal; and
   determining, according to the first information, whether to perform RLM measurement adjustment and/or BFD detection adjustment,
      wherein the determining, according to the first information, whether to perform RLM measurement adjustment and/or BFD detection adjustment comprises:
      determining, according to a measurement result of a current cell and a preset threshold, whether to perform the RLM measurement and/or BFD detection adjustment of the current cell, and in response to the measurement result of the current cell being greater than or equal to a nineteenth threshold, performing RLM measurement relaxation and/or BFD detection relaxation of the current cell;
      wherein the measurement result of the current cell comprises a reference signal receiving power (RSRP), a reference signal receiving quality (RSRQ), a signal to noise and interference ratio (SINR), and a channel quality indicator (CQI).

2. The method according to claim 1, wherein the determining, according to a measurement result of a current cell and a preset threshold, whether to perform the RLM measurement adjustment and/or BFD detection adjustment comprises:
   in response to that the measurement result of the current cell and the preset threshold satisfy a fourth condition, performing RLM measurement relaxation and/or BFD detection relaxation;
   or
   in response to that the measurement result of the current cell and the preset threshold satisfy a sixth condition, performing normal RLM measurement and/or normal BFD detection;
   or
   in response to that the measurement result of the current cell and the preset threshold satisfy an eighth condition, performing RLM measurement enhancement and/or BFD detection enhancement.

3. The method according to claim 2, wherein
   the fourth condition comprises one of the following:
   the measurement result of the current cell is greater than or equal to the nineteenth threshold within a nineteenth preset time;
   the measurement result of the current cell remains greater than or equal to the nineteenth threshold within the nineteenth preset time;
   the measurement result of the current cell is greater than or equal to the nineteenth threshold, and the measurement result of the current cell is not less than a twentieth threshold within a twentieth preset time;
   the measurement result of the current cell is greater than or equal to the nineteenth threshold, and the measurement result of the current cell remains not less than the twentieth threshold within the twentieth preset time;
   a change in the measurement result of the current cell within a twenty-first preset time is less than or equal to a twenty-first threshold;
   the change in the measurement result of the current cell within the twenty-first preset time is less than or equal to the twenty-first threshold, and a change in the measurement result of the current cell within a twenty-second preset time is not greater than or equal to a twenty-second threshold; and
   the change in the measurement result of the current cell within the twenty-first preset time is less than or equal to the twenty-first threshold, and a change in the measurement result of the current cell within a twenty-third preset time is greater than or equal to a twenty-third threshold;
   or
   the sixth condition comprises one of the following:
   the measurement result of the current cell is less than or equal to or greater than a twenty-fourth threshold;
   the measurement result of the current cell is less than or equal to or greater than the twenty-fourth threshold within a twenty-fourth preset time;
   the measurement result of the current cell remains less than or equal to or greater than the twenty-fourth threshold within the twenty-fourth preset time;
   the measurement result of the current cell is less than or equal to or greater than the twenty-fourth threshold, and the measurement result of the current cell is not greater than or not less than a twenty-fifth threshold within a twenty-fifth preset time;
   the measurement result of the current cell is less than or equal to or greater than the twenty-fourth threshold, and the measurement result of the current cell remains not greater than or not less than the twenty-fifth threshold within the twenty-fifth preset time;
   a change in the measurement result of the current cell within a twenty-sixth preset time is greater than or equal to or less than a twenty-sixth threshold;
   the change in the measurement result of the current cell within the twenty-sixth preset time is greater than or equal to the twenty-sixth threshold, and no change in the measurement result of the current cell within a twenty-seventh preset time is less than or equal to a twenty-seventh threshold; and
   the change in the measurement result of the current cell within the twenty-sixth preset time is greater than or equal to the twenty-sixth threshold, and a change in the measurement result of the current cell within a twenty-eighth preset time is greater than or equal to a twenty-eighth threshold;
   or
   the eighth condition comprises one of the following:
   the measurement result of the current cell is less than or equal to a twenty-ninth threshold;
   the measurement result of the current cell is less than or equal to the twenty-ninth threshold within a twenty-ninth preset time;
   the measurement result of the current cell remains less than or equal to the twenty-ninth threshold within the twenty-ninth preset time;
   the measurement result of the current cell is less than or equal to the twenty-ninth threshold, and the measurement result of the current cell is not less than or not greater than a thirtieth threshold within a thirtieth preset time;

the measurement result of the current cell is less than or equal to the twenty-ninth threshold, and the measurement result of the current cell remains not less than or not greater than the thirtieth threshold within the thirtieth preset time;

a change in the measurement result of the current cell within a thirty-first preset time is greater than or equal to a thirty-first threshold;

the change in the measurement result of the current cell within the thirty-first preset time is greater than or equal to the thirty-first threshold, and a change in the measurement result of the current cell within a thirty-second preset time is less than or equal to a thirty-second threshold; and the change in the measurement result of the current cell within the thirty-first preset time is greater than or equal to the thirty-first threshold, and no change in the measurement result of the current cell within the thirty-second preset time is less than or equal to the thirty-second threshold.

4. The method according to claim 1, wherein one or more preset thresholds corresponding to the measurement result of the current cell are the same as or different from a threshold for determining in the connected state whether to perform measurement on a neighboring cell or at another frequency.

5. The method according to claim 1, wherein the first information further comprises: status information of the terminal, environment information, and network coverage information.

6. The method according to claim 5, wherein the determining, according to the first information, whether to perform RLM measurement and/or BFD detection adjustment comprises:

in response to that it is determined according to the first information that the terminal has entered a coverage area of a corresponding cell or beam, performing RLM measurement relaxation, RLM measurement enhancement, BFD detection relaxation or BFD detection enhancement;

or in response to that it is determined according to the first information that the terminal has left a coverage area of a corresponding cell or beam, performing normal RLM measurement or normal BFD detection.

7. The method according to claim 1, further comprising: obtaining parameters configured by a network side; and determining, according to the parameters configured by the network side, whether to perform RLM measurement adjustment and/or BFD detection adjustment.

8. The method according to claim 7, wherein the parameters configured by the network side comprise one or more of the following: a parameter of a timer, a third preset time, a preset measurement period quantity, a preset detection period quantity, a preset measurement sample quantity, a preset detection sample quantity, and a parameter of a counter; and the determining, according to the parameters configured by the network side, whether to perform RLM measurement and/or BFD detection adjustment comprises one or more of the following:

in response to that a time at which the terminal performs RLM measurement relaxation, RLM measurement enhancement, BFD detection relaxation or BFD detection enhancement reaches the third preset time, performing normal RLM measurement or normal BFD detection;

when the terminal starts to perform the RLM measurement relaxation, the RLM measurement enhancement, the BFD detection relaxation or the BFD detection enhancement, starting the timer, and when the timer expires, performing the normal RLM measurement or the normal BFD detection;

in response to that a measurement period quantity of performing the RLM measurement relaxation or the RLM measurement enhancement by the terminal reaches the preset measurement period quantity, performing the normal RLM measurement;

in response to that a detection period quantity of performing the BFD detection relaxation or the BFD detection enhancement by the terminal reaches the preset detection period quantity, performing the normal BFD detection;

in response to that a measurement sample quantity of performing the RLM measurement relaxation or the RLM measurement enhancement by the terminal reaches the preset measurement sample quantity, performing the normal RLM measurement;

in response to that a detection sample quantity of performing the BFD detection relaxation or the BFD detection enhancement by the terminal reaches the preset detection sample quantity, performing the normal BFD detection;

when the terminal starts to perform the RLM measurement relaxation or the RLM measurement enhancement, starting the counter, adjusting a count value of the counter according to a measurement period of the RLM measurement relaxation or the RLM measurement enhancement, and when the count value reaches a preset quantity, performing the normal RLM measurement;

when the terminal starts to perform the BFD detection relaxation or the BFD detection enhancement, starting the counter, adjusting a count value of the counter according to a detection period of the BFD detection relaxation or the BFD detection enhancement, and when the count value reaches a preset quantity, performing the normal BFD detection;

when the terminal starts to perform the RLM measurement relaxation or the RLM measurement enhancement, starting the counter, adjusting a count value of the counter according to a measurement sample of the RLM measurement relaxation or the RLM measurement enhancement, and when the count value reaches a preset quantity, performing the normal RLM measurement; and when the terminal starts to perform the BFD detection relaxation or the BFD detection enhancement, starting the counter, adjusting a count value of the counter according to a detection sample of the BFD detection relaxation or the BFD detection enhancement, and when the count value reaches a preset quantity, performing the normal BFD detection.

9. The method according to claim 7, wherein the parameters configured by the network side are configured in at least one manner in the following:

the network side configures the corresponding parameters for each terminal;

the network side configures the corresponding parameters for each cell;

the network side configures the corresponding parameters for each frequency, carrier, band or bandwidth part;

the network side configures the corresponding parameters for each frequency, carrier, band or bandwidth part of each terminal; and the network side configures the corresponding parameters for each beam.

10. The method according to claim 7, wherein before the obtaining parameters configured by a network side, the method further comprises:

sending a request message to the network side, the request message being used for requesting the network side to configure the parameters configured by the network side, or the request message indicating that the terminal needs to perform RLM measurement relaxation, RLM measurement enhancement, normal RLM measurement, BFD detection relaxation, BFD detection enhancement or normal BFD detection.

11. A terminal in a connected state, comprising a processor, a memory, and a program stored in the memory and capable of being run on the processor, the program implementing the steps of a Radio Link Monitor (RLM) adjustment and/or Beam Failure Detection (BFD) adjustment method when being executed by the processor, wherein the method comprises:

obtaining first information, the first information comprising: a measurement result of the terminal; and determining, according to the first information, whether to perform RLM measurement adjustment and/or BFD detection adjustment, wherein the determining, according to the first information, whether to perform RLM measurement adjustment and/or BFD detection adjustment comprises:

determining, according to a measurement result of a current cell and a preset threshold, whether to perform the RLM measurement and/or BFD detection adjustment of the current cell, and in response to the measurement result of the current cell being greater than or equal to a nineteenth threshold, performing RLM measurement relaxation and/or BFD detection relaxation of the current cell;

wherein the measurement result of the current cell comprises a reference signal receiving power (RSRP), a reference signal receiving quality (RSRQ), a signal to noise and interference ratio (SINR), and a channel quality indicator (CQI).

12. The terminal according to claim 11, wherein the determining, according to a measurement result of a current cell and a preset threshold, whether to perform the RLM measurement adjustment and/or BFD detection adjustment comprises:

in response to that the measurement result of the current cell and the preset threshold satisfy a fourth condition, performing RLM measurement relaxation and/or BFD detection relaxation;

or in response to that the measurement result of the current cell and the preset threshold satisfy a sixth condition, performing normal RLM measurement and/or normal BFD detection;

or in response to that the measurement result of the current cell and the preset threshold satisfy an eighth condition, performing RLM measurement enhancement and/or BFD detection enhancement.

13. The terminal according to claim 11, wherein the first information further comprises: status information of the terminal, environment information, and network coverage information.

14. The terminal according to claim 11, wherein the method further comprises: obtaining parameters configured by a network side; and determining, according to the parameters configured by the network side, whether to perform RLM measurement adjustment and/or BFD detection adjustment.

15. A non-transitory computer-readable storage medium, storing thereon a computer program, the computer program implementing the steps of a Radio Link Monitor (RLM) adjustment and/or Beam Failure Detection (BFD) adjustment method when being executed by a processor, wherein the method comprises:

obtaining first information, the first information comprising one or more of the following: a measurement result of a terminal in a connected state; and determining, according to the first information, whether to perform RLM measurement adjustment and/or BFD detection adjustment, wherein the determining, according to the first information, whether to perform RLM measurement adjustment and/or BFD detection adjustment comprises:

determining, according to a measurement result of a current cell and a preset threshold, whether to perform the RLM measurement and/or BFD detection adjustment of the current cell, and in response to the measurement result of the current cell being greater than or equal to a nineteenth threshold, performing RLM measurement relaxation and/or BFD detection relaxation of the current cell;

wherein the measurement result of the current cell comprises a reference signal receiving power (RSRP), a reference signal receiving quality (RSRQ), a signal to noise and interference ratio (SINR), and a channel quality indicator (CQI).

16. The non-transitory computer-readable storage medium according to claim 15, wherein the determining, according to a measurement result of a current cell and a preset threshold, whether to perform the RLM measurement adjustment and/or BFD detection adjustment comprises:

in response to that the measurement result of the current cell and the preset threshold satisfy a fourth condition, performing RLM measurement relaxation and/or BFD detection relaxation;

or in response to that the measurement result of the current cell and the preset threshold satisfy a sixth condition, performing normal RLM measurement and/or normal BFD detection;

or in response to that the measurement result of the current cell and the preset threshold satisfy an eighth condition, performing RLM measurement enhancement and/or BFD detection enhancement.

17. The non-transitory computer-readable storage medium according to claim 15, wherein the first information further comprises: status information of the terminal, environment information, and network coverage information.

18. The non-transitory computer-readable storage medium according to claim 15, wherein the method further comprises: obtaining parameters configured by a network side; and determining, according to the parameters configured by the network side, whether to perform RLM measurement adjustment and/or BFD detection adjustment.

\* \* \* \* \*